United States Patent
Suzuki et al.

(10) Patent No.: US 11,115,325 B2
(45) Date of Patent: Sep. 7, 2021

(54) CONTROL DEVICE, TRANSFER DEVICE, AND CONTROL METHOD

(71) Applicant: FUJITSU LIMITED, Kawasaki (JP)

(72) Inventors: Dai Suzuki, Kawasaki (JP); Satoshi Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 129 days.

(21) Appl. No.: 16/511,594

(22) Filed: Jul. 15, 2019

(65) Prior Publication Data

US 2019/0342209 A1 Nov. 7, 2019

Related U.S. Application Data

(63) Continuation of application No. PCT/JP2018/000275, filed on Jan. 10, 2018.

(30) Foreign Application Priority Data

Jan. 30, 2017 (JP) .............................. JP2017-013801

(51) Int. Cl.
*H04L 12/741* (2013.01)
*H04L 12/721* (2013.01)

(52) U.S. Cl.
CPC .............. *H04L 45/54* (2013.01); *H04L 45/70* (2013.01)

(58) Field of Classification Search
CPC .......... H04L 45/54; H04L 45/70; H04L 45/64
See application file for complete search history.

(56) References Cited

U.S. PATENT DOCUMENTS

| | | | |
|---|---|---|---|
| 2003/0051165 A1 | 3/2003 | Krishnan et al. | |
| 2006/0067231 A1 | 3/2006 | Ikoma et al. | |
| 2013/0064243 A1* | 3/2013 | Akiyoshi | H04L 45/745 370/389 |
| 2017/0149808 A1* | 5/2017 | Hamada | H04L 63/0209 |
| 2018/0083873 A1* | 3/2018 | Seino | H04L 49/30 |

FOREIGN PATENT DOCUMENTS

| | | |
|---|---|---|
| JP | 2000-174808 | 6/2000 |
| JP | 2006-121667 | 5/2006 |
| JP | 2009-077030 | 4/2009 |
| JP | 2015-032932 | 2/2015 |
| JP | 2016-103697 | 6/2016 |

OTHER PUBLICATIONS

International Search Report, mailed in connection with PCT/JP2018/000275 and dated Apr. 3, 2018 (1 page).

* cited by examiner

*Primary Examiner* — Will W Lin
(74) *Attorney, Agent, or Firm* — Fujitsu Patent Center

(57) ABSTRACT

A control device that controls a transfer device, includes a memory and a processor coupled to the memory and configured to evaluate, for each of a plurality of processing rules to be used to process a packet in the transfer device, a processing load caused upon identification of a packet matching the processing rule, based on the type of an application requirement identifying the packet to which the processing rule is applied, generate, as a table to be used by the transfer device, a rule table storing the plurality of processing rules in order from the lowest processing load to the highest processing load, and transmit, to the transfer device, a control packet to request the transfer device to set the rule table.

9 Claims, 19 Drawing Sheets

FIG. 1
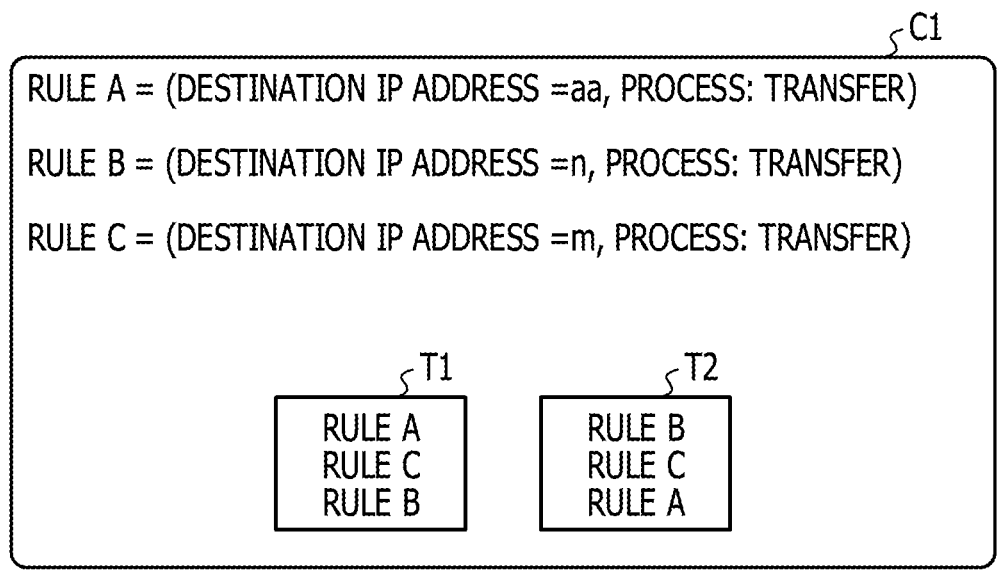
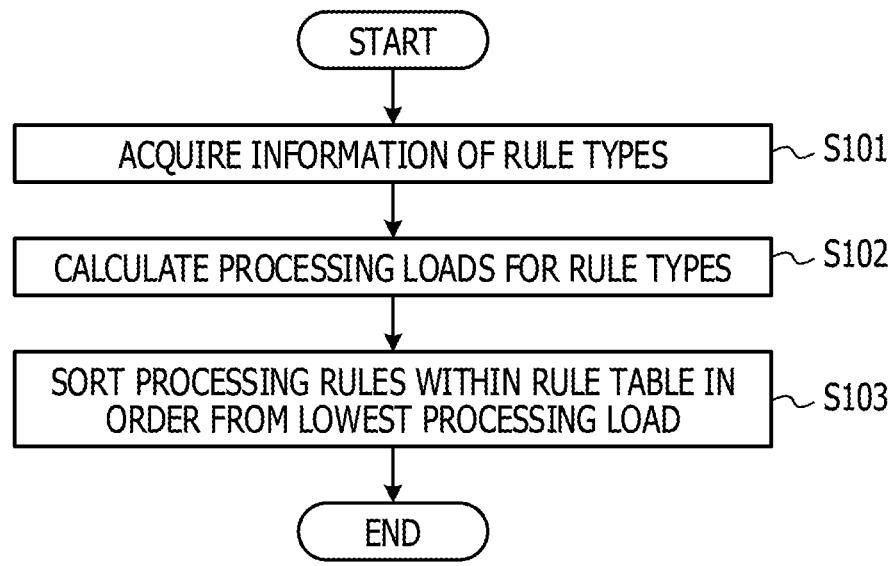

FIG. 7

| PERFORMANCE PROFILE | VALUE |
|---|---|
| $b_{dip}$ | $3.69*10^{-9}$ |
| $b_{sip}$ | $3.49*10^{-9}$ |
| $b_{dp}$ | $1.44*10^{-8}$ |
| $b_{sip}$ | $1.32*10^{-8}$ |

| T11 | | |
|---|---|---|
| No. | APPLICATION REQUIREMENT | PROCESS |
| 1 | DESTINATION IP = aa | ... |
| 2 | DESTINATION IP = ab | ... |
| ⋮ | ⋮ | ⋮ |
| 100 | DESTINATION IP = cd | |
| 101 | DESTINATION PORT = m | |
| ⋮ | ⋮ | |
| 200 | DESTINATION PORT = n | |

| T12 | | |
|---|---|---|
| No. | APPLICATION REQUIREMENT | PROCESS |
| 1 | DESTINATION PORT = m | ... |
| 2 | DESTINATION PORT = mn | ... |
| ⋮ | ⋮ | ⋮ |
| 100 | DESTINATION PORT = n | |
| 101 | DESTINATION IP = aa | |
| ⋮ | ⋮ | |
| 200 | DESTINATION IP = cd | |

| PROCESSING RULES | | SETTING DESTINATION |
|---|---|---|
| 1 | DESTINATION IP ADDRESS | :a TRANSFER | TRANSFER DEVICE 5a |
| 2 | SOURCE IP ADDRESS | :b TRANSFER | |
| 3 | DESTINATION PORT NUMBER | :c TRANSFER | |
| 4 | SOURCE IP ADDRESS | :d TRANSFER | |

61

| RULE ID | RULE TYPE | TRAFFIC |
|---|---|---|
| 1 | DESTINATION IP ADDRESS | 684 |
| 2 | SOURCE IP ADDRESS | 632 |
| 3 | DESTINATION PORT NUMBER | 246 |
| 4 | SOURCE IP ADDRESS | 230 |

32-2

| PROCESSING RULE | | SETTING DESTINATION |
|---|---|---|
| 2 | SOURCE IP ADDRESS | :b TRANSFER | TRANSFER DEVICE 5a |
| 4 | SOURCE IP ADDRESS | :d TRANSFER | |
| 1 | DESTINATION IP ADDRESS | :a TRANSFER | |
| 3 | DESTINATION PORT NUMBER | :c TRANSFER | |

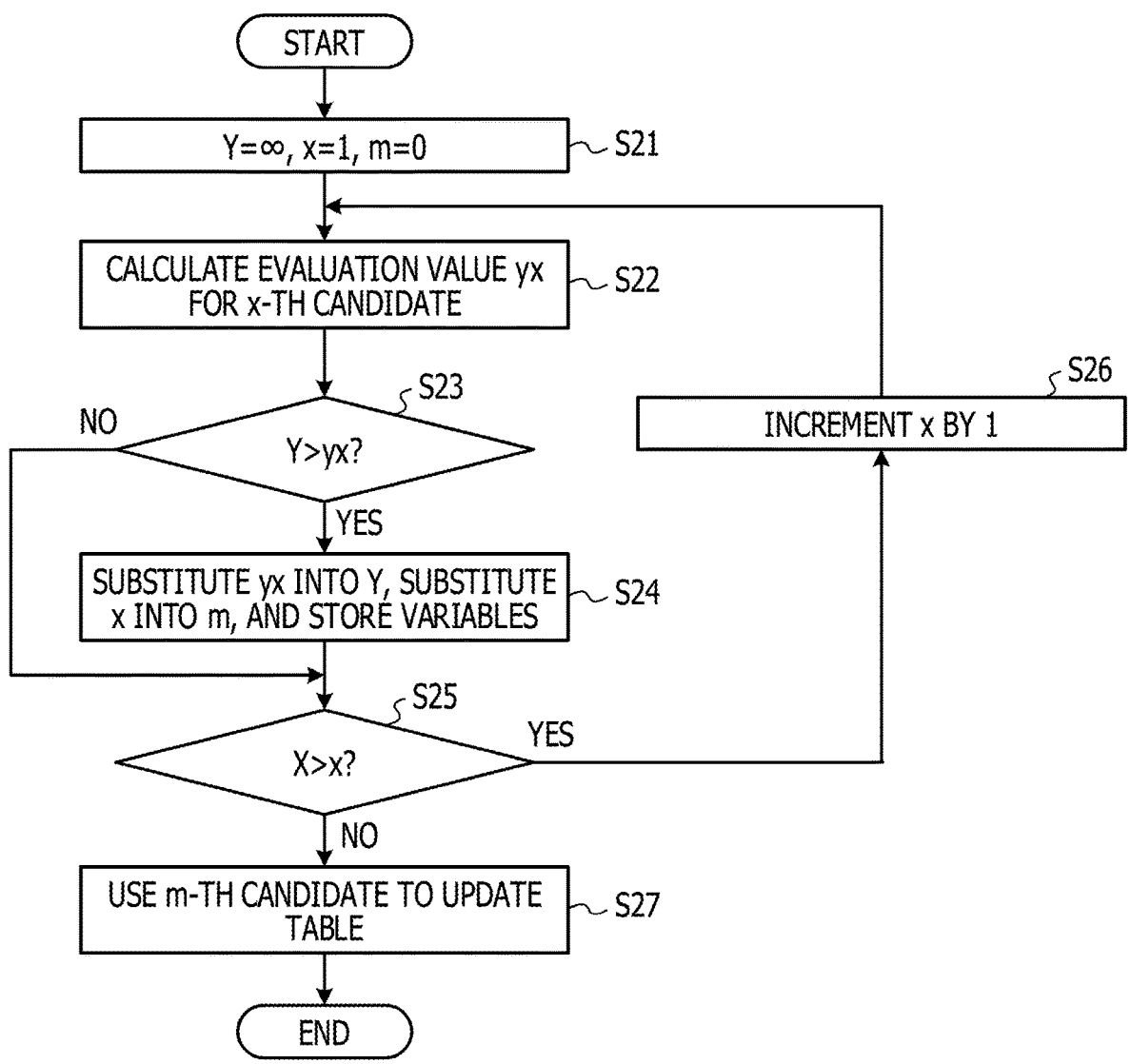

FIG. 17

RULE TABLE (32-3)

1. (DESTINATION PORT NUMBER 60 : DISCARDING)
2. (SOURCE IP ADDRESS 192.168.10.0/24. : DISCARDING)
3. (DESTINATION PORT NUMBER 80 : TRANSFER)

T21

| CANDIDATE FOR ORDER OF RULES | CONFLICT DETERMINATION RESULT |
|---|---|
| 1,3,2 | NG |
| 2,1,3 | OK |
| 2,3,1 | OK |
| 3,1,2 | NG |
| 3,2,1 | NG |

CONTROL DEVICE, TRANSFER DEVICE, AND CONTROL METHOD

CROSS-REFERENCE TO RELATED APPLICATION

This application is a continuation application of International Application PCT/JP2018/000275 filed on Jan. 10, 2018 and designated the U.S., the entire contents of which are incorporated herein by reference. The International Application PCT/JP2018/000275 is based upon and claims the benefit of priority of the prior Japanese Patent Application No. 2017-013801, filed on Jan. 30, 2017, the entire contents of which are incorporated herein by reference.

FIELD

The embodiments relate to a control device, a transfer device, and a control method.

BACKGROUND

In recent years, attention has been focused on network functions virtualization (NFV) that virtualizes network functions. According to NFV, network functions are enabled by applications executed in general-purpose servers. Thus, the cost of a network device for a system using NFV may be reduced, compared with a system in which each network function is enabled by a dedicated device. In addition, NFV may improve the flexibility and functionality of a network service.

However, when a network function is virtualized, the processing performance of the network function may vary depending on a virtualization environment or set details used to enable the network function. For example, the maximum throughput of a network function, which is a firewall, a router, or the like and executes a process of searching for a table, depends on the number of times that the table is searched for upon a packet process. For example, when a general-purpose server operates as a firewall, the general-purpose server repeatedly executes a process of comparing information included in a header of a received packet with matching requirements included in a rule table until a matching requirement applicable to the received packet is identified. As the number of times that the determination of whether a matching requirement is applicable to the received packet is made is larger, a processing load of the server operating as the firewall is higher and a delay of the transfer of the packet is longer. A packet filter has been proposed, which migrates matching requirements included in a table so that a matching requirement that more frequently matches a received data packet is migrated to a position closer to the top of the table in order of matching requirement and that a matching requirement that less frequently matches a received data packet is migrated to a position closer to the bottom of the table in order of matching requirement (refer to, for example, Japanese Laid-open Patent Publication No. 2000-174808 and the like).

As a related technique, a rule control device has been proposed, which evaluates multiple rules in predetermined order, determines a rule to be applied to a packet, and generates a second rule based on the number of times that the rule has been applied and characteristic information of a first rule evaluated last (refer to, for example, Japanese Laid-open Patent Publication No. 2009-77030 and the like). In the rule control device, the second rule is set to be evaluated before the first rule.

For example, as related art, Japanese Laid-open Patent Publication No. 2000-174808, Japanese Laid-open Patent Publication No. 2009-77030, and the like have been disclosed.

Loads to be applied due to processing executed to determine whether multiple rules to be used for a process to be executed on a packet are applicable may not be the same. In a process of reducing a processing load of a server, a difference between processing loads caused by the determination of whether multiple rules are applicable is not considered. A certain processing rule set in a region close to the top of a rule table is to be searched for in a search for a process executed on a packet to which a processing rule registered after the certain processing rule is applied. Thus, it is assumed that requirements are migrated so that as a requirement more frequently matches a received data packet, the requirement is migrated to a position closer to the top of a rule table in order of matching requirement. Even in this case, when a load applied due to the determination of a processing rule set in a region close to the top of the rule table is high, a processing load caused by a process of searching for the table may not be reduced.

Under such circumstances, it is desirable to reduce a processing load caused by a process of searching for a table.

SUMMARY

According to an aspect of the embodiments, a control device that controls a transfer device, includes a memory and a processor coupled to the memory and configured to evaluate, for each of a plurality of processing rules to be used to process a packet in the transfer device, a processing load caused upon identification of a packet matching the processing rule, based on the type of an application requirement identifying the packet to which the processing rule is applied, generate, as a table to be used by the transfer device, a rule table storing the plurality of processing rules in order from the lowest processing load to the highest processing load, and transmit, to the transfer device, a control packet to request the transfer device to set the rule table.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram describing an example of a method of setting a rule table according to a first embodiment;

FIG. 7 is a diagram describing an example of a performance profile table;

FIG. 14 is a diagram describing an example of the rule table and traffic information;

FIG. 15 is a flowchart describing an example of a method of setting the rule table according to a second embodiment;

FIG. 17 is a diagram describing an example in which conflict determination is made;

DESCRIPTION OF EMBODIMENTS

Figure 2:
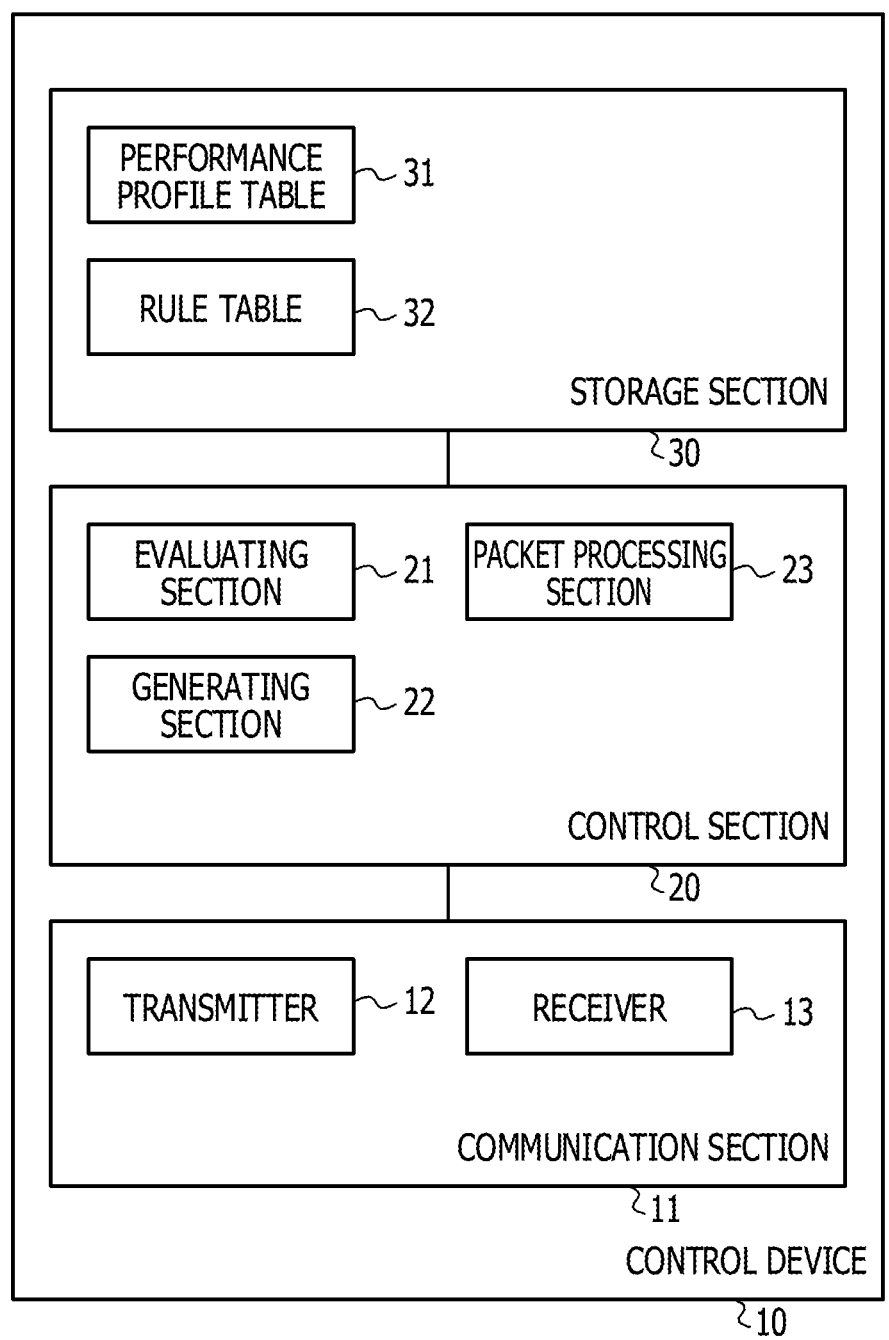
FIG. 2 is a diagram describing an example of a configuration of a control device.

FIG. 1 is a diagram describing an example of a method of setting a rule table according to a first embodiment. A load applied due to the determination of whether a rule to be used for a process to be executed on a packet is applied may vary depending on the type of a requirement (application requirement) to be used to determine whether the processing rule is applied.

Case C1 indicates an example of multiple rules applicable to a process to be executed on a packet. Case C1 indicates three rules A, B, and C. It is assumed that a value of a destination Internet Protocol (IP) address of a packet is specified as an application requirement of the rule A and that values of destination port numbers of packets are specified as application requirements of the rules B and C. In this case, a processing load applied due to the determination of whether the rule A is applied to a packet to be processed is the sum of a processing load applied due to the reading of the destination IP address from an IP header of the packet and a processing load applied due to a process of comparing the read destination IP address with the application requirement. A processing load applied due to the determination of whether the rule B or the rule C is applied to a packet to be processed is the sum of a processing load applied due to the reading of a destination port number from a payload of the packet and a processing load applied due to the comparison of the read destination port number with an application requirement.

A processing load applied due to access to information that is a destination IP address or the like and included in an IP header is lower than a processing load applied due to access to information that is a port number or the like and included in a payload in many cases. It may be said that a processing load applied due to the destination of whether the rule A is applied to a packet to be processed is lower than a processing load applied due to the determination of whether the rule B or the rule C is applied to a packet to be processed. In addition, as a load applied due to processing is lower, a time period for the processing is shorter. Thus, it is estimated that a time period for determining whether the rule A is applied to a packet to be processed is shorter than a time period for determining whether the rule B or the rule C is applied to a packet to be processed. A time period for identifying a processing rule to be applied to a packet is the sum of time periods for a process of determining whether processing rules are applicable to the packet. Thus, the time period for identifying the processing rule to be applied to the packet varies depending on the order in which processing rules are stored in a rule table.

For example, a device that uses a rule table indicated in a table T1 determines whether the rules A, B, and C are applicable to a packet in the order of the rules A, C, and B. A device that uses a rule table indicated by table T2 determines whether the rules A, B, and C are applicable to a packet in the order of the rules B, C, and A. It is assumed that a packet to which the rule C is applied is to be processed. In this case, the device that uses the table T1 determines whether the rule A is applied, and determines whether the rule C is applied. Thus, the device that uses the table T1 determines that the rule C is applied to the packet to be processed. A time period for determining the rule to be applied to the packet to be processed in accordance with the rule C is the sum of a time period for determining whether the rule A is applied and a time period for determining whether the rule C is applied. Since the device that uses the table T2 determines whether the rule B is applied, and determines whether the rule C is applied. Thus, a time period for determining a rule to be applied to a packet to be processed in accordance with the rule C is the sum of a time period for determining whether the rule B is applied and a time period for determining whether the rule C is applied. The time period for determining whether the rule A is applied is shorter than the time period for determining whether the rule B is applied. Thus, the device that uses the table T1 may more quickly process a packet to which the rule C has been applied than the device that uses the table T2. A device according to each of embodiments sorts processing rules within a rule table in order from the lowest processing load to the highest processing load.

The processing device according to each of the embodiments acquires information of rule types for processing rules included in the rule table (in step S101). The "rule types" are types of parameters to be used to specify application requirements for the processing rules. Combinations of information elements to be used to specify the application requirements are combinations of multiple information items such as combinations of destination IP addresses and destination port numbers or the like and are acquired as the rule types for the processing rules in which the application requirements are specified. After that, the processing device calculates a processing load for each of the rule types (in step S102). Then, the processing device sorts the processing rules included in the rule table in order from the lowest processing load to the highest processing load (in step S103).

In this manner, the processing device sorts the processing rules included in the rule table in order from the lowest processing load to the highest processing load. Thus, a processing load caused by a search for a processing rule to be applied in the processing device is low, compared with the case where a table in which the number of processing rules to be subjected to the determination of whether the processing rules are applicable is the same and the processing rules are not sorted in order from the lowest processing load to the highest processing load is used. The processing device according to each of the embodiments may be a control device that sets a rule table in a transfer device installed in a network. Alternatively, the processing according to each of the embodiments may be a transfer device that sets multiple processing rules acquired from a control device in a rule table.

First Embodiment

A first embodiment describes, as an example, the case where a control device that sets a rule table in a transfer device installed in a network sets the order of processing rules included in the rule table.

FIG. 2 is a diagram describing an example of a configuration of the control device 10. The control device 10 includes a communication section 11, a control section 20, and a storage section 30. The communication section 11 includes a transmitter 12 and a receiver 13. The transmitter 12 transmits a packet to another device. For example, the transmitter 12 transmits, to a transfer device to be controlled, a control packet such as a packet including a processing rule to be used by the transfer device. The receiver 13 receives a packet from the other device. For example, the receiver 13 may receive, from the transfer device to be controlled, a packet including information such as an operational state of the transfer device.

The storage section 30 stores a performance profile table 31 and a rule table 32. In the rule table 32, information that is set in transfer devices is associated with the transfer devices to be controlled by the control device 10 and is recorded. Examples of the performance profile table 31 and rule table 32 are described later.

The control section 20 includes an evaluating section 21, a generating section 22, and a packet processing section 23. Upon acquiring processing rules from the rule table 32, the evaluating section 21 uses the performance profile table 31 to calculate a processing load for each of rule types to be used to set application requirements of the processing rules. The performance profile table 31 is information with which processing loads are associated for the rule types to be used to set the application requirements of the processing rules set in the rule table 32. The generating section 22 generates the rule table 32 by sorting the processing rules in order from the lowest processing load applied due to a process of determining whether a packet matches an application requirement. The packet processing section 23 processes a received packet and generates a packet to be transmitted. For example, the packet processing section 23 generates a control packet to be used to notify information included in the rule table 32 or the like to a transfer device in which the rule table 32 is to be set.

Figure 3:
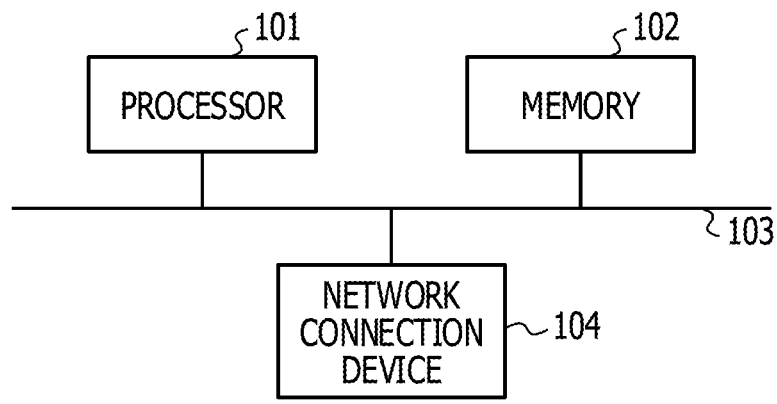
FIG. 3 is a diagram describing an example of a hardware configuration of the control device.

FIG. 3 is a diagram describing an example of a hardware configuration of the control device 10. The control device 10 includes a processor 101, a memory 102, a bus 103, and a network connection device 104. The processor 101 is an arbitrary processing circuit. The processor 101 may be a central processing unit (CPU), for example. The processor 101 uses the memory 102 as a working memory to execute a program, thereby executing various processes. The memory 102 includes a random access memory (RAM) and a nonvolatile memory such as a read only memory (ROM). The memory 102 is used to store the program and data to be used for the processes to be executed by the processor 101. The network connection device 104 is used to communicate with the other device via the network. The bus 103 connects the processor 101, the memory 102, and the network connection device 104 to each other so that the processor 101, the memory 102, and the network connection device 104 receive and output data from and to each other.

In the control device 10, the processor 101 operates as the control section 20 and the memory 102 operates as the storage section 30. In the control device 10, the network connection device 104 operates as the communication section 11.

Figure 4:
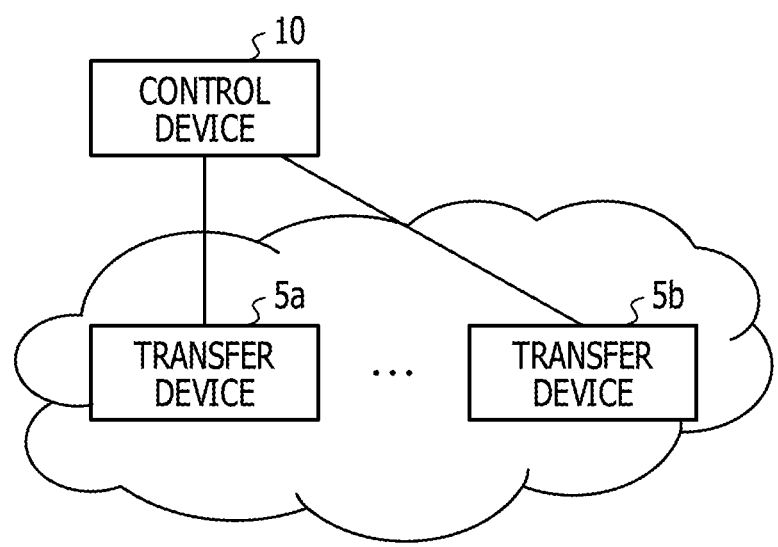
FIG. 4 is a diagram describing an example of a network.

FIG. 4 is a diagram describing an example of the network. One or more transfer devices 5 (5a and 5b) and the control device 10 are included in the network. For example, the control device 10 may be a software defined networking (SDN) controller. In this case, the transfer devices 5 operate as SDN switches. When each of the transfer devices 5 receives a packet from another transfer device 5 or a terminal (not illustrated) executing communication via the concerned transfer device 5, the concerned transfer device 5 uses a rule table held in the concerned transfer device 5 to determine a process to be executed on the packet. The control device 10 sets a rule table in the transfer devices 5, changes the rule table, and the like. FIG. 4 is an example. The number of transfer devices 5 to be controlled by the control device 10 may be arbitrarily changed based on implementation.

The first embodiment separately describes the acquisition of the performance profile table 31, an example of the calculation of a time period for processing a packet, and the setting of processing rules. A performance profile indicates a time period for determining whether one processing rule in which an application requirement for a certain rule type is set is applied.

(1) Acquisition of Performance Profile Table 31

Figure 5:
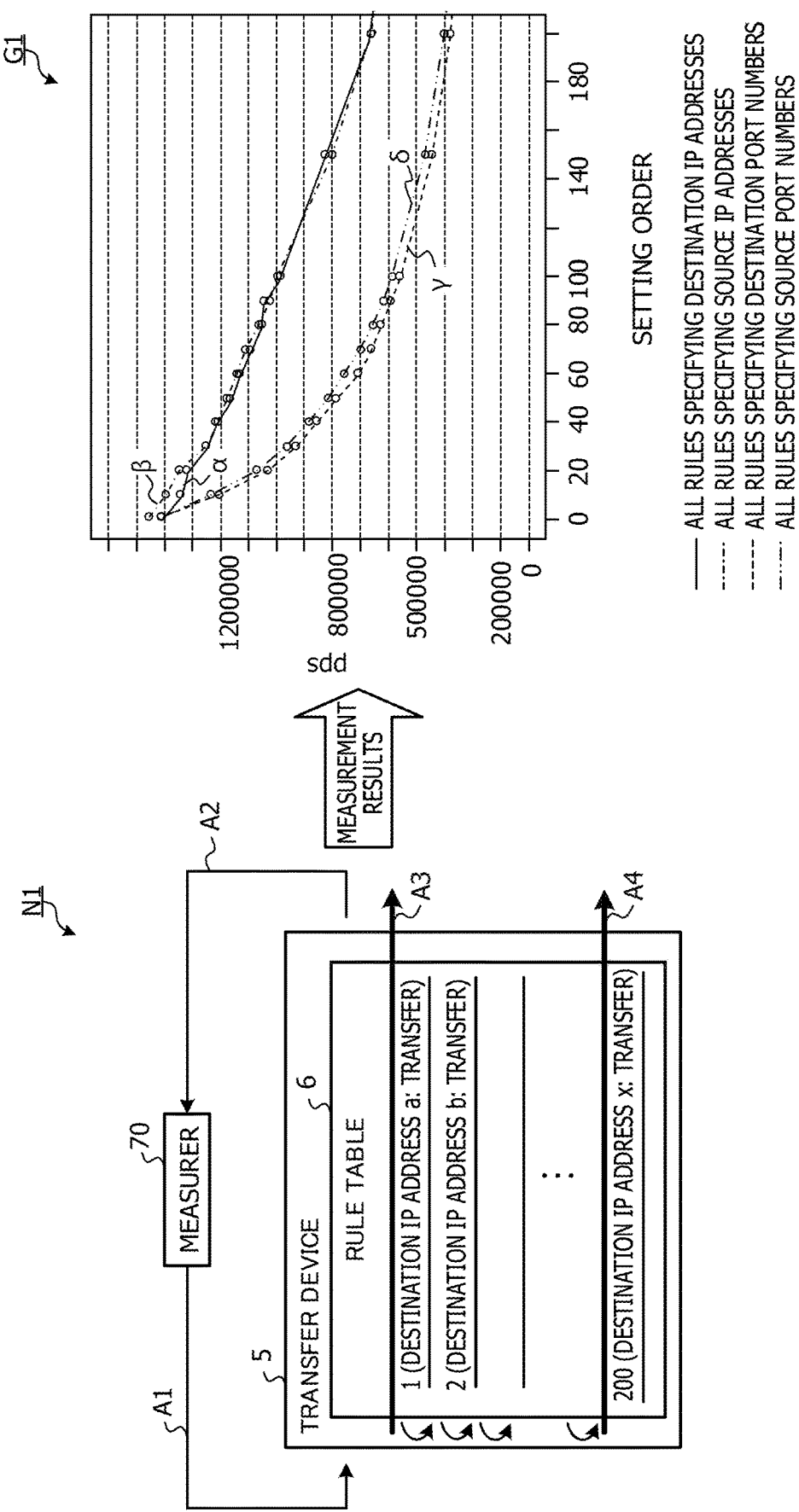
FIG. 5 is a diagram describing an example of a process of measuring maximum throughput.

FIG. 5 is a diagram describing an example of a process of measuring maximum throughput in order to generate the performance profile table. A data transfer speed is hereinafter referred to as "throughput" in some cases. The performance profile table is acquired by causing a transfer device 5 to read a rule table 6 in which multiple processing rules of the same rule type to be used to set application requirements are set and causing a measurer 70 to measure the speed of processing a packet in the transfer device 5.

A network N1 illustrated in FIG. 5 indicates a network via which the rule table 6 including processing rules in which application requirements are set using destination IP addresses is set in the transfer device 5. The measurer 70 is connected to the transfer device 5 and transmits, to the transfer device 5, a packet to which any of the processing rules included in the rule table 6 is applicable (refer to an arrow A1). In addition, the measurer 70 receives the packet processed by the transfer device 5 (refer to an arrow A2). Thus, the measurer 70 may measure the speed (throughput) of transferring the packet via the transfer device 5.

The measurer 70 holds the rule table 6 in advance. In the generation of the packet to be transmitted to the transfer device 5, the measurer 70 recognizes the order that the processing rule that is applied to the generated packet to be transmitted is stored in the rule table 6. In the rule table 6 illustrated in FIG. 5, processing rules are written in parentheses, and numbers written before the processing rules and indicating the order that the processing rules are to be used for processes in the transfer device 5 are described. The order that each processing rule is determined to be, or not be, applicable to a packet to be processed is hereinafter referred to as "setting order" in some cases. For example, in the rule table 6 illustrated in FIG. 5, a processing rule with setting order=1 indicates that a packet with a destination IP address=a is transferred. Similarly, a processing rule with setting order=2 indicates that a packet with a destination IP address=b is transferred. A processing rule with setting order=200 indicates that a packet with a destination IP address=x is transferred.

The measurer 70 transmits, for each of numbers indicating setting order during a predetermined time period, multiple packets to which a processing rule with setting order indicated by the number are applied, and analyzes the packets received from the transfer device 5, thereby calculating the maximum throughput for the packets for each of the numbers indicating the setting order. For example, it is assumed that the measurer 70 transmits multiple packets with the destination IP address=a to the transfer device 5 during the predetermined time period. The transfer device 5 references the rule table 6 and determines that the processing rule with the setting order=1 is applied to the received packets. Then, the transfer device 5 executes a process of transferring the packets in accordance with the processing rule with the setting order=1 (refer to an arrow A3). After that, the measurer 70 receives the packets transferred by the transfer device 5 via a route indicated by the arrow A2, thereby calculating the maximum throughput for the packets to which the processing rule with the setting order=1 has been applied.

Similarly, it is assumed that the measurer 70 transmits packets with the destination IP address=x to the transfer device 5 during a predetermined time period. The transfer device 5 references the rule table 6 and determines whether each of the processing rules is applicable to the received packets in the order indicated by the setting order of the processing rules. As a result, after the transfer device 5 determines that the processing rule with the setting order=200 is applied to the packets with the destination IP address=x, the transfer device 5 executes a process of transferring the packets with the destination IP address=x in accordance with the processing rule with the setting order=200 (refer to an arrow A4). In this case, the measurer 70 receives the packets transferred by the transfer device 5 via the route indicated by the arrow A2, thereby calculating the maximum throughput for the packets to which the processing rule with the setting order=200 has been applied. The measurer 70 calculates throughput for packets to which the other processing rules with the other setting order are applied after the transfer device 5 executes the process of transferring the packets.

α indicated in a graph G1 illustrated in FIG. 5 indicates throughput obtained in a process of transferring to a transfer device 5 holding a rule table 6 including only processing rules in which application requirements are set using destination IP addresses. α to δ indicated in the graph G1 indicate that throughput calculated by the measurer 70 is associated with setting order of processing rules applied to packets used for the calculation of the throughput.

β indicated in the graph G1 illustrated in FIG. 5 indicates throughput obtained in a process of transferring to a transfer device 5 holding a rule table 6 including only processing rules in which application requirements are set using source IP addresses. A process to be executed to measure the throughput is the same as or similar to the process described with reference to the network N1. The multiple processing rules in which the application requirements are set using the source IP addresses, however, are recorded in the rule table 6 held in the transfer device 5 to be used to calculate β. In the case where application requirements are set using destination port numbers and the case where application requirements are set using source port numbers, relationships between throughput and setting order of the processing rules are calculated by a process that is the same as or similar to the generation of the graphs of α and β. γ indicates a graph obtained in the case where application requirements are set using destination port numbers, while δ indicates a graph obtained in the case where application requirements are set using source port numbers.

Figure 6:
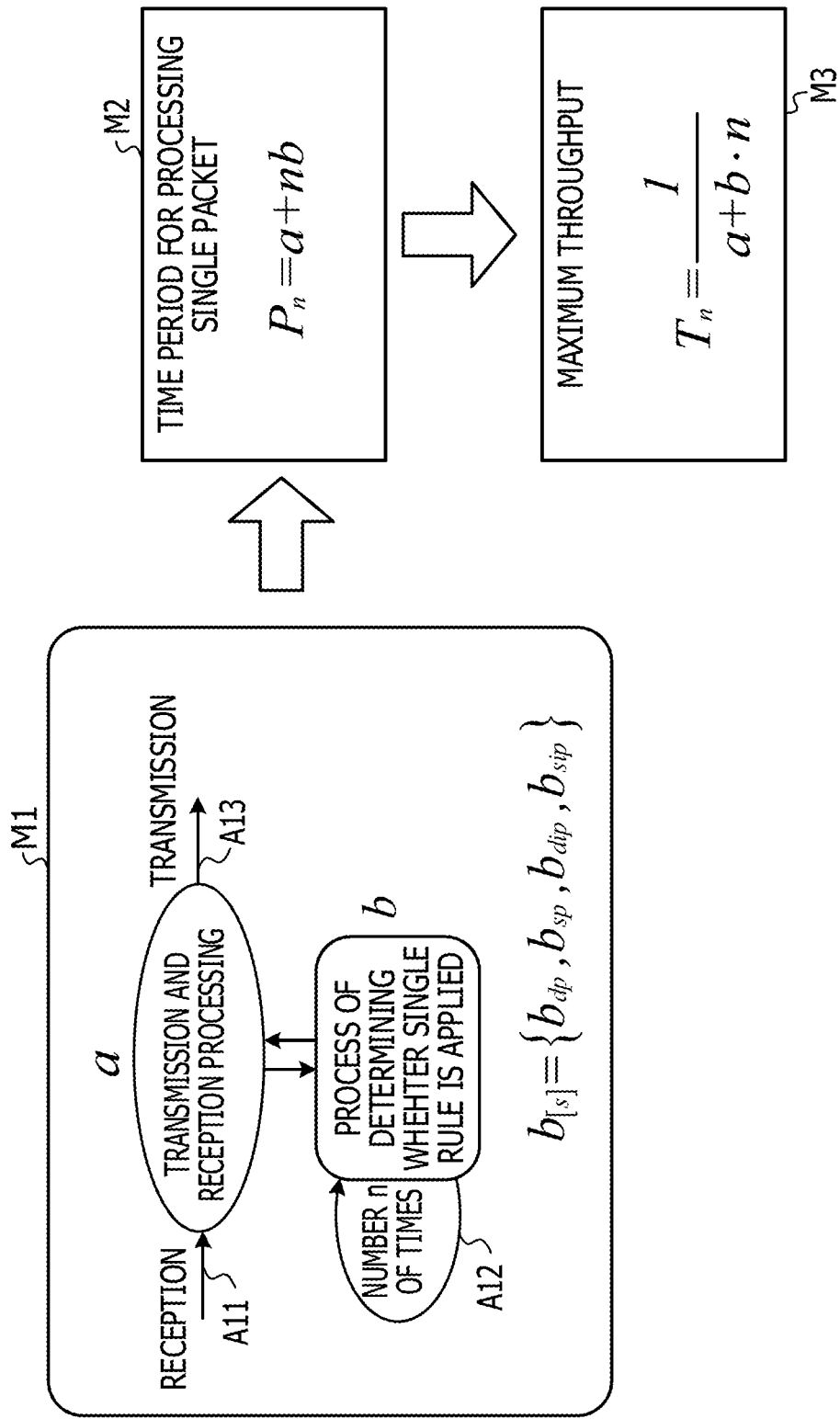
FIG. 6 is a diagram describing an example of a method of calculating a performance profile.

FIG. 6 is a diagram describing an example of a method of calculating a performance profile. A model M1 is an example of a model for executing a packet transfer process. It is assumed that the packet transfer process is divided into three processes, a process (indicated by an arrow A11) of receiving a packet by a transfer device 5, a process (indicated by an arrow A12) of searching for a processing rule to be applied to the packet to be processed, and a process (indicated by an arrow A13) of transmitting the packet by the transfer device 5 to a transfer destination. It is considered that the sum of a time period for a process of receiving a single packet by the transfer device 5 and a time period for a process of transmitting the single packet by the transfer device 5 to a transfer destination is almost fixed regardless of the type of the packet and the type of a processing rule applied to the packet. It is assumed that the sum of the time period for the process of receiving the single packet and the time period for the process of transmitting the single packet is a fixed value a. The process of searching for the processing rule to be applied to the packet to be processed is repeated until a processing rule applicable to the packet to be processed is detected, as indicated by the arrow A12. The number of times that a process of determining whether a processing rule is applied is executed until a processing rule applicable to the packet to be processed is detected is indicated by n. In addition, a time period for a process of determining whether a single processing rule is applied is indicated by b. In this case, b varies depending on a rule type of an application requirement set in the processing rule. In the following description, a time period for determining whether a single processing rule is applied in the case where an application requirement is set using a destination port number is indicated by $b_{dp}$. In addition, a time period for determining whether a single processing rule is applied in the case where an application requirement is set using a source port number is indicated by $b_{sp}$. A time period for determining whether a single processing rule is applied in the case where an application requirement is set using a destination IP address is indicated by $b_{dip}$. Similarly, a time period for determining whether a single processing rule is applied in the case where an application requirement is set using a source IP address is indicated by $b_{sip}$. A value indicated by b in the model M1 is any of $b_{dip}$, $b_{sip}$, $b_{dp}$, and $b_{sp}$ depending on a type of information to be used to specify an application requirement.

A model M2 uses an equation to indicate a time period $P_n$ for processing a packet in the case where a processing rule to be applied is determined by executing a determination process to determine whether processing rules of the same rule type are applied a number n of times. As described with reference to FIG. 5, when a rule table storing processing rules of a specific rule type is used, a time period for processing a packet is the sum of a time period a for transmitting and receiving the packet and a time period n×b for executing the determination process the number n of times and is indicated in the model M2.

A model M3 uses an equation to indicate maximum throughput $T_n$ obtained in the case where the time period for processing a packet is indicated by the model M2. The maximum throughput is indicated by the number of packets to be processed by the transfer device 5 per second, while the model M2 indicates the time period for processing each of the packets. Thus, the maximum throughput $T_n=1/(a+b \times n)$. Each of the values b indicated in the models M2 and M3 is any of $b_{dip}$, $b_{sip}$, $b_{dp}$, and $b_{sp}$ depending on a type of information to be used to specify an application requirement.

The measurer 70 uses the equation indicated in the model M3 illustrated in FIG. 6 to execute fitting on measurement results indicated by the graph G1 illustrated in FIG. 5, thereby calculating values of a, $b_{dip}$, $b_{sip}$, $b_{dp}$, and $b_{sp}$. For example, the measurer 70 executes the fitting on the graph of α using $T_n=1/(a+b_{dip} \times n)$, the graph of β using $T_n=1/(a+b_{sip} \times n)$, the graph of γ using $T_n=1/(a+b_{dp} \times n)$, and the graph of δ using $T_n=1/(a+b_{sp} \times n)$. An arbitrary known calculation method such as the least-square method may be used to execute the fitting, for example.

FIG. 7 illustrates an example of values of the performance profile table that are obtained by causing the measurer 70 to execute the fitting on the graph G1 illustrated in FIG. 5. In the example illustrated in FIG. 7, $b_{dip}=3.69 \times 10^{-9}$, $b_{sip}=3.49 \times 10^{-9}$, $b_{dp}=1.44 \times 10^{-8}$, and $b_{sp}=1.32 \times 10^{-8}$. The measurer 70 stores the obtained information as the performance profile table, as illustrated in FIG. 7. The measurer 70 outputs the obtained performance profile table to the control device 10. Then, the control device 10 stores, as the performance profile table 31, the information received from the measurer 70 and uses the performance profile table 31 for a subsequent process.

Figure 8:
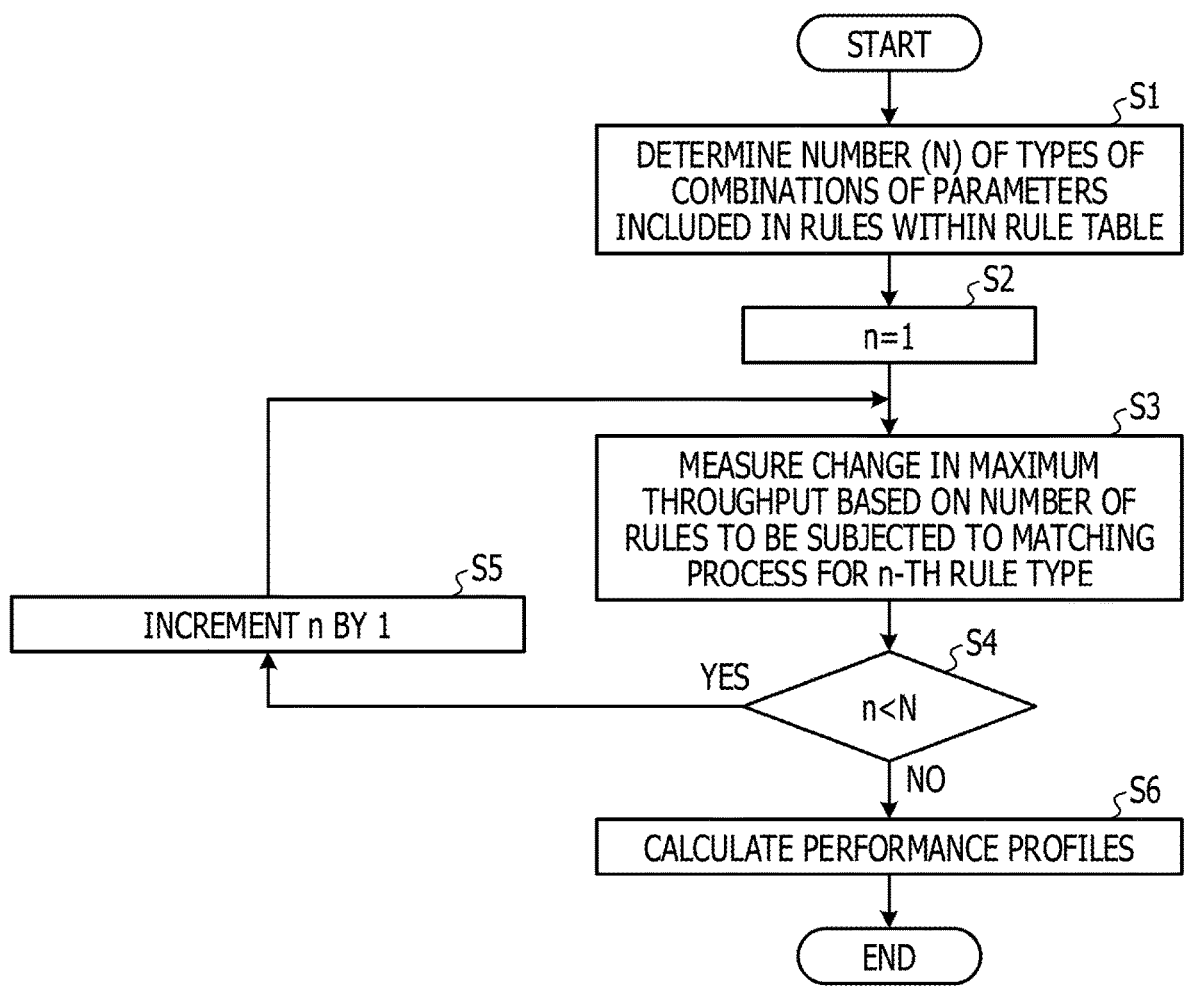
FIG. 8 is a flowchart describing an example of the method of calculating a performance profile.

FIG. 8 is a flowchart describing an example of the method of calculating a performance profile. In the example illustrated in FIG. 8, a fixed value N and a variable n are used. The fixed value N indicates the number of types (rule types) of combinations of parameters included as application requirements in processing rules. The variable n is used to count one or more rule types to be processed.

The measurer 70 reads the rule table 32 to be set by the control device 10 and determines the number (N) of types of combinations of parameters included as application requirements in processing rules included in the rule table 32 (in step S1). For example, it is assumed that all processing rules used to generate the graphs of α to δ illustrated in FIG. 5 are included in the rule table 32. The rule table 32 includes four cases, a case in which application requirements are determined using destination IP addresses, a case in which application requirements are determined using source IP addresses, a case in which application requirements are determined using destination port numbers, and a case in which application requirements are determined using source port numbers. Thus, the number N of rule types is 4. Next, the measurer 70 sets the variable n to 1 (in step S2). The measurer 70 measures, for an n-th rule type, a change in maximum throughput based on the number of rules to be subjected to a matching process (in step S3). An example of measurement results obtained by the process of step S3 is the graph G1 illustrated in FIG. 5. The measurer 70 determines whether the variable n is smaller than the fixed value N (in step S4). When the variable n is smaller than the fixed value N (Yes in step S4), the measurer 70 increments the variable n by 1 and causes a process illustrated in FIG. 8 to return to step S3 (in step S5).

When the variable n is equal to or larger than the fixed value N (No in step S4), the measurer 70 executes the fitting to calculate performance profiles (in step S6). For example, the measurer 70 calculates, for each of the rule types, a time period (performance profile) b for determining whether a single processing rule is applied, and the measurer 70 calculates, for each of the rule types, a time period a for transmitting and receiving a packet. When the measurement results are the graph G1 illustrated in FIG. 5, the performance profiles calculated in step S6 are $b_{dip}$, $b_{sip}$, $b_{dp}$, and $b_{sp}$.

(2) Example of Calculation of Time Period for Processing Packet

A time period for processing a packet may be calculated using the performance profile table 31 and setting order of the processing rules included in the rule table 32.

Figure 9:
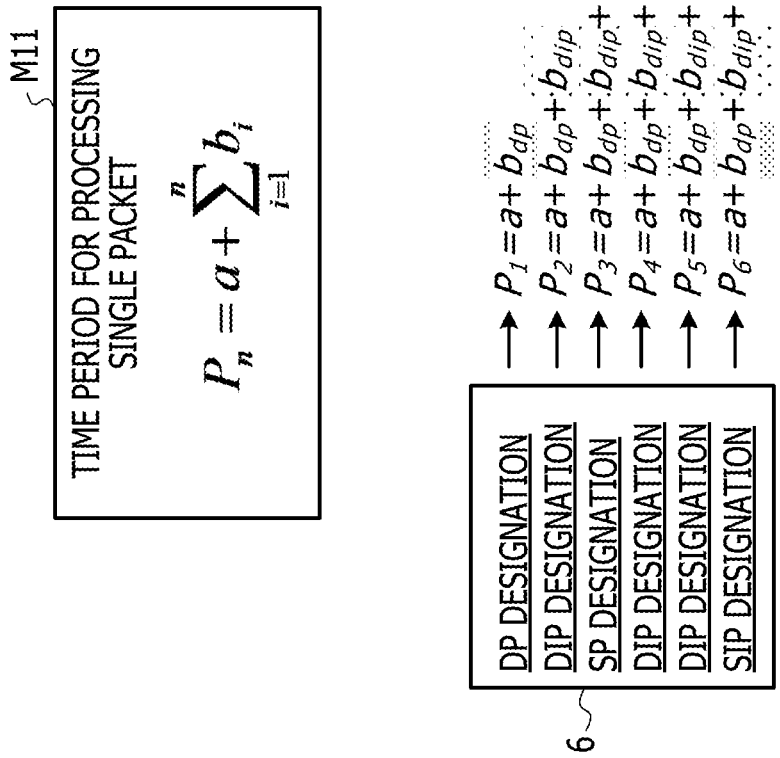
FIG. 9 is a diagram describing an example of the calculation of a time period for processing a packet.

FIG. 9 is a diagram describing an example of the calculation of a time period for processing a packet. FIG. 9 illustrates the example of the calculation of the time period for processing a single packet in the case where a rule table including, as processing rules, application requirements of multiple rule types is applied, unlike the examples illustrated in FIGS. 5 and 6. In this case, the time period for processing a single packet is indicated in a model M11 illustrated in FIG. 9. For example, a time period $P_n$ for processing a single packet in the case where a processing rule applicable to the packet is detected by determining whether a number n of processing rules are applicable is the sum of a time period a for transmitting and receiving the packet and a performance profile value associated with application requirements of all the processing rules to be subjected to the determination process. In the model M11, $b_i$ is a performance profile value associated with an i-th processing rule. The performance profile value is a processing time period for determining whether the processing rule is applied, as illustrated in the example of FIG. 9.

FIG. 9 also illustrates a specific example of the calculation of a processing time period in the case where the model M11 is applied. It is assumed that the rule table 6 used in the transfer device 5 includes six processing rules. In addition, it is assumed that a rule specifying an application requirement using a destination port number (DP) is set first and that rules specifying application requirements using destination IP addresses (DIP) are set second, fourth, and fifth. Furthermore, it is assumed that a rule specifying an application requirement using a source port number (SP) is set third and that a rule specifying an application requirement using a source IP address (SIP) is set sixth. Furthermore, it is assumed that a time period for executing the determination process on the application requirement specified using the destination port number (DP) is $b_{dp}$ and that a time period for executing the determination process on the application requirement specified using the source port number (SP) is $b_{sp}$. Similarly, it is assumed that a time period for executing the determination process on each of the application requirements specified using the destination IP addresses (DIP) is $b_{dip}$ and that a time period for executing the determination process on the application requirement specified using the source IP address (SIP) is $b_{sip}$.

In this case, a time period $P_1$ for processing a packet to which the first processing rule is applied is the sum of a time period a for transmitting and receiving the packet and a time period $b_{dp}$ for executing the process of determining whether the first processing rule is applied. A time period $P_2$ for processing a packet to which the second processing rule is applied is the sum of a time period a for transmitting and receiving the packet, a time period $b_{dp}$ for the process of determining whether the first processing rule is applied, and a time period $b_{dip}$ for executing the process of determining whether the second processing rule is applied. Similarly, a time period $P_3$ for processing a packet to which the third processing rule is applied is $a+b_{dp}+b_{dip}+b_{sp}$. In addition, a time period $P_4$ for processing a packet to which the fourth processing rule is applied is $a+b_{dp}+b_{dip}+b_{sp}+b_{dip}$. A time period $P_5$ for processing a packet to which the fifth processing rule is applied is $a+b_{dp}+b_{dip}+b_{sp}+b_{dip}+b_{dip}$. Furthermore, a time period $P_6$ for processing a packet to which the sixth processing rule is applied is $a+b_{dp}+b_{dip}+b_{sp}+b_{dip}+b_{dip}+b_{sip}$.

(3) Setting of Processing Rules

As described with reference to FIG. 9, a time period for processing each packet is the sum of a time period for executing the process of determining whether one or more processing rules are applicable to the packet before a processing rule to be applied is identified and a time period for a process of transmitting and receiving the packet. When a time period for determining whether a processing rule is applicable to a packet is short and the processing rule is set in a region close to the top of the rule table 32, a processing load of the transfer device 5 may be low. A method of causing the control device 10 to use the performance profile table 31 to determine the setting order of the processing rules included in the rule table 32 is described below.

Figure 10:
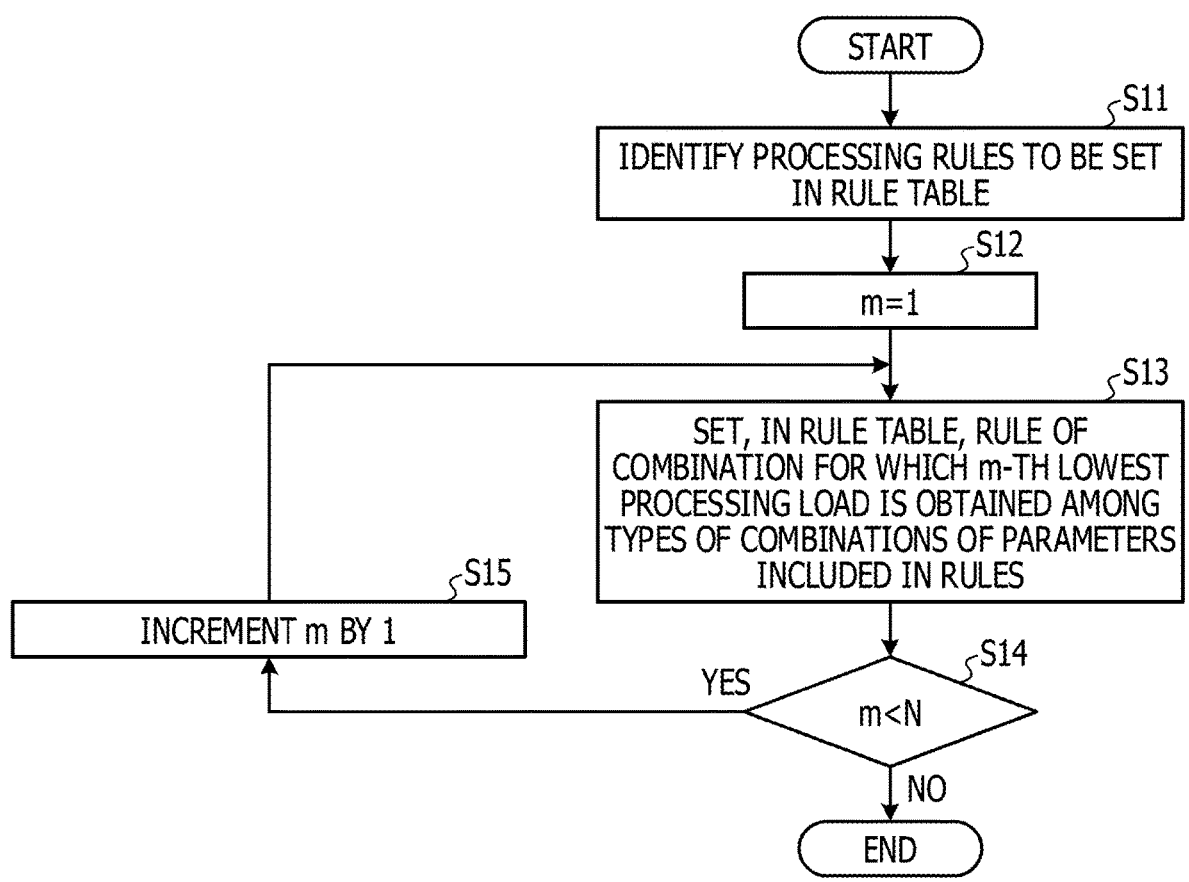
FIG. 10 is a flowchart describing an example of a method of setting a rule table.

FIG. 10 is a flowchart describing an example of a method of setting the rule table. In the example illustrated in FIG. 10, a fixed value N and a variable m are used. The fixed value N indicates the number of types (rule types) of combinations of parameters included as application requirements in processing rules. The variable m is used to count one or more rule types to be processed.

When the performance profile table 31 is set in the control device 10 by the measurer 70, the evaluating section 21 identifies processing rules to be set in the rule table 32 (in step S11). The evaluating section 21 sets the variable m to 1 (in step S12). After that, the evaluating section 21 determines processing loads for the processing rules for each of the types (rule types) of the combinations of parameters included as the application requirements in the processing rules. The generating section 22 sets, in the rule table 32, a processing rule of a rule type for which an m-th lowest processing load has been obtained (in step S13). In this case, multiple processing rules for which the m-th lowest processing load has been obtained may exist. When the multiple processing rules for which the m-th lowest processing load has been obtained exist, all the processing rules for which the m-th lowest processing load has been obtained are set in step S13. After that, the generating section 22 determines whether the variable m is smaller than the fixed value N (in step S14). When the variable m is smaller than the fixed value N (Yes in step S14), the generating section 22 increments the variable m by 1 and causes a process illustrated in FIG. 10 to return to step S13 (in step S15). When the variable m is equal to or larger than the fixed value N (No in step S14), the setting of all the rules is already completed and the generating section 22 terminates the process illustrated in FIG. 10.

Figure 11:
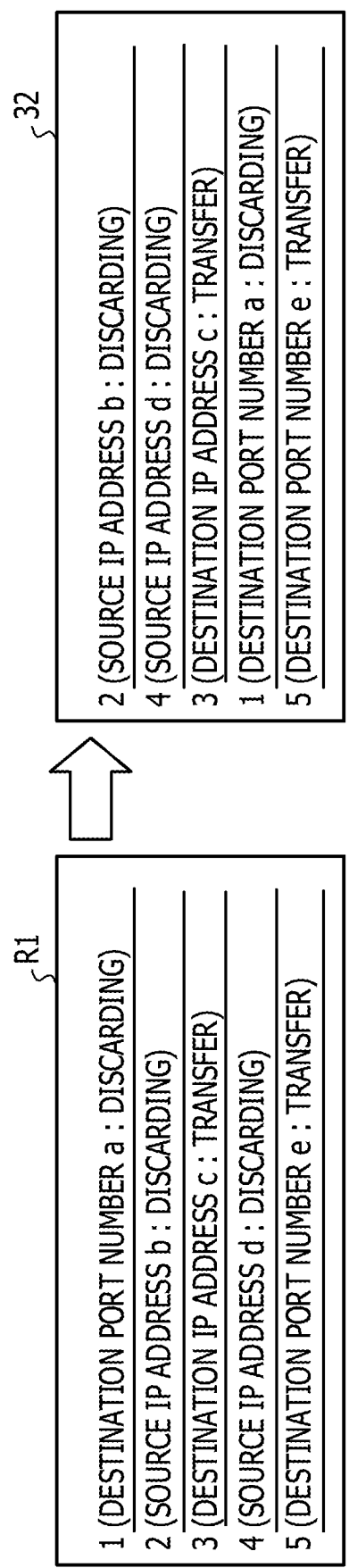
FIG. 11 is a diagram describing an example of the rule table.

FIG. 11 is a diagram describing an example of the rule table. The following describes, with reference to FIG. 11, an example of processes that are executed by the evaluating section 21 and the generating section 22 in the case where five processing rules indicated by R1 and to be set in a certain transfer device 5 are specified.

The evaluating section 21 acquires rule types from the processing rules indicated by R1 and evaluates a processing load for each of the rule types. Setting order of the processing rules indicated by R1 is used as rule numbers of the processing rules in order to clarify a process of setting the rules. For example, a processing rule having a rule number=1 specifies that a packet with a destination port number=a is to be discarded, and a processing rule having a rule number=3 specifies that a packet with a destination IP address=c is to be transferred.

In the example illustrated in FIG. 11, since application requirements are set using destination port numbers in the processing rule having the rule number=1 and a processing rule having a rule number=5, the evaluating section 21 estimates that a processing load for each of the processing rules is $b_{dp}$. Since application requirements are set using source IP addresses in processing rules having rule numbers=2 and 4, the evaluating section 21 estimates that a processing load for each of the processing rules is $b_{sip}$. Since an application requirement is set using a destination IP address in a processing rule having a rule number=3, the evaluating section 21 estimates that a processing load for the single processing rule is $b_{dip}$.

The generating section 22 identifies the order of values of $b_{dp}$, $b_{sip}$, and $b_{dip}$ using the performance profile table 31 (illustrated in FIG. 7). The generating section 22 determines that a processing load for $b_{dp}$ > a processing load for $b_{dip}$ > a processing load for $b_{sip}$. The generating section 22 sets, in a top region of the rule table 32 as rules to be set in the transfer device 5, the processing rules (having rule numbers=2 and 4) in which the application requirements are set using the source IP addresses. Since the application requirement is set using the destination IP address in the processing rule having the rule number=3, the generating section 22 sets the processing rule having the rule number=3 immediately after the processing rule having the rule number=4 in the rule table 32. In addition, since the application requirements are set using the destination port numbers in the processing rules having the rule numbers=1 and 5, the generating section 22 sets the processing rule having the rule number=5 immediately after the processing rule having the rule number=3 in the rule table 32. As a result, the rule table 32 illustrated in FIG. 11 is obtained.

When the rule table 32 is generated, the packet processing section 23 included in the control device 10 generates a control packet to set information of the rule table 32 in the transfer device 5. The packet processing section 23 transmits the generated control packet to the transfer device 5 via the transmitter 12. As the control packet, an arbitrary packet available to notify the processing rules to the transfer device 5 may be used. For example, the control packet may be an OpenFlow FlowMod message. Upon receiving the control packet, the transfer device 5 stores the notified processing rules as the rule table 6 and processes a data packet received after the reception of the control packet in accordance with the rule table 6.

Figure 12:
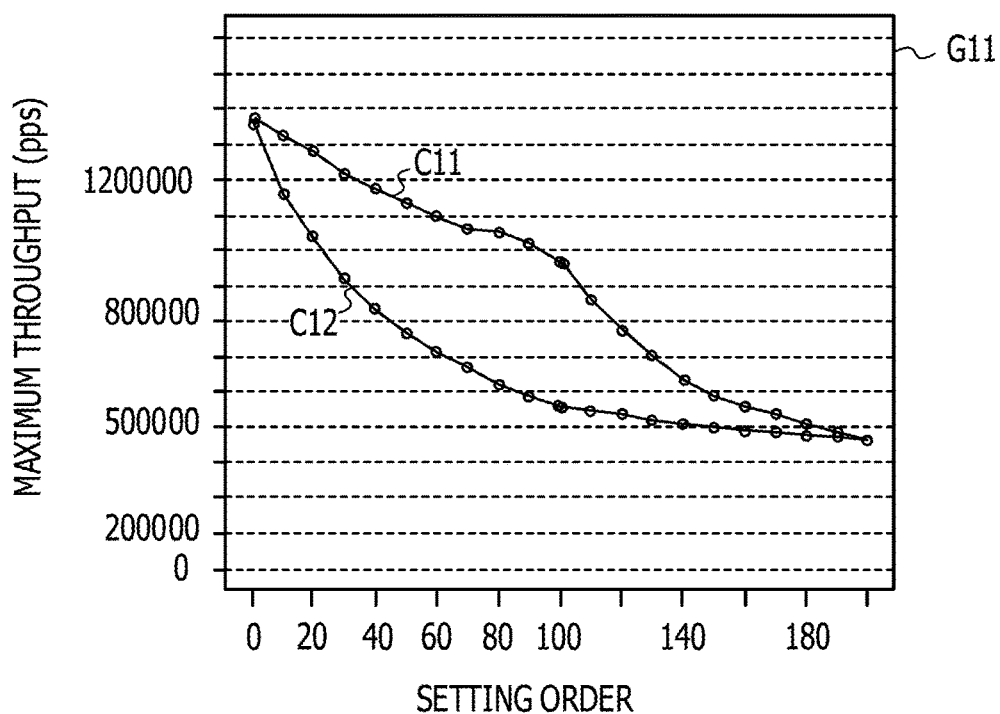
FIG. 12 is a diagram describing relationships between details set in the rule table and maximum throughput.

FIG. 12 is a diagram describing relationships between details set in the rule table and maximum throughput. The example illustrated in FIG. 12 assumes that 100 processing rules in which application requirements are set using destination IP addresses and 100 processing rules in which application requirements are set using destination port numbers are included in a rule table set in a certain transfer device 5.

Case C11 indicates an example in which the rule table 32 is generated in the control device 10 in accordance with the method according to the first embodiment and the rule table 6 of the transfer device 5 is set in accordance with the rule table 32. It is assumed that the rule table 32 generated in case C11 and the rule table 6 set in the transfer device 5 are indicated by a table T11. A time period for executing the determination process on an application requirement set using a destination IP address is shorter than a time period for executing the determination process on an application requirement set using a destination port number. Thus, in the table T11, application requirements are set using destination IP addresses in 1st to 100th processing rules from the top of the rule table. In the table T11, application requirements are set using destination port numbers in 101st and later processing rules from the top of the rule table.

Case C12 indicates an example in which a rule table generated in accordance with a method different from the method according to the first embodiment is used in the transfer device 5. It is assumed that the rule table used in case C12 is indicated by a table T12. In the table T12, application requirements are set using destination port numbers in 1st to 100th processing rules from the top of the rule table, and application requirements are set using destination IP addresses in 101st and later processing rules from the top of the rule table.

A graph G11 indicates relationships between setting order of processing rules included in a rule table used in the transfer device 5 and maximum throughput obtained by a process executed on packets to which the processing rules are applied in each of cases C11 and C12. In case C12, since the table T12 is used, whether processing rules, which are to be determined to be applicable or to not be applicable using destination port numbers, are applicable is determined first. Thus, as indicated by a graph indicated by C12 in the graph G11, the maximum throughput in case C12 is lower than the maximum throughput in case C11 even for processing rules that have setting order=20 to 100 in the rule table and are to be determined to be applied or to not be applied at relatively early stages.

In case C11, whether processing rules to be determined to be applicable or to not be applicable using destination IP addresses are applicable is determined first as indicated by the table T11 in the first embodiment. Thus, as indicated by a graph indicated by C11 in the graph G11, the maximum throughput in case C11 is higher than the maximum throughput in case C12 for the processing rules that have the setting order=20 to 100 in the rule table and are to be determined to be applied or not be applied at the relatively early stages. In addition, since a time period for determining whether the processing rules with the setting order=1 to 100 are applicable in case C11 is shorter than a time period for determining whether the processing rules with the setting order=1 to 100 are applicable in case C12, a time period for processing packets to which the 101st and later processing rules to be determined to be applicable or to not be applicable using destination port numbers are applied in case C11 is shorter than that in case C12. Thus, the maximum throughput for packets to which the 101st to 199th processing rules are applied in case C11 is higher than the maximum throughput for the packets to which the 101st to 199th processing rules are applied in case C12.

In this manner, according to the first embodiment, the processing rules included in the rule table are sorted in order from the lowest processing load to the highest processing load. When the rule table is used and set in the first embodiment, the throughput is high, compared with the case where a table in which the number of processing rules to be subjected to the determination of whether the processing rules are applicable is the same and the processing rules are not set in order from the lowest processing load to the highest processing load is used. In addition, in the first embodiment, since the throughput is high, a processing load caused by a search for a processing rule in a transfer device 5 may be reduced.

Second Embodiment

A second embodiment describes a process to be executed in the case where a rule table is optimized using processing loads for processing rules and traffic of packets to which the processing rules are applied. The second embodiment describes, as an example, the case where a control device 40 sets the rule table in a transfer device 5 to be controlled by the control device 40. A network including the control device 40 and the transfer device 5 is the same as or similar to the network illustrated in FIG. 4.

Figure 13:
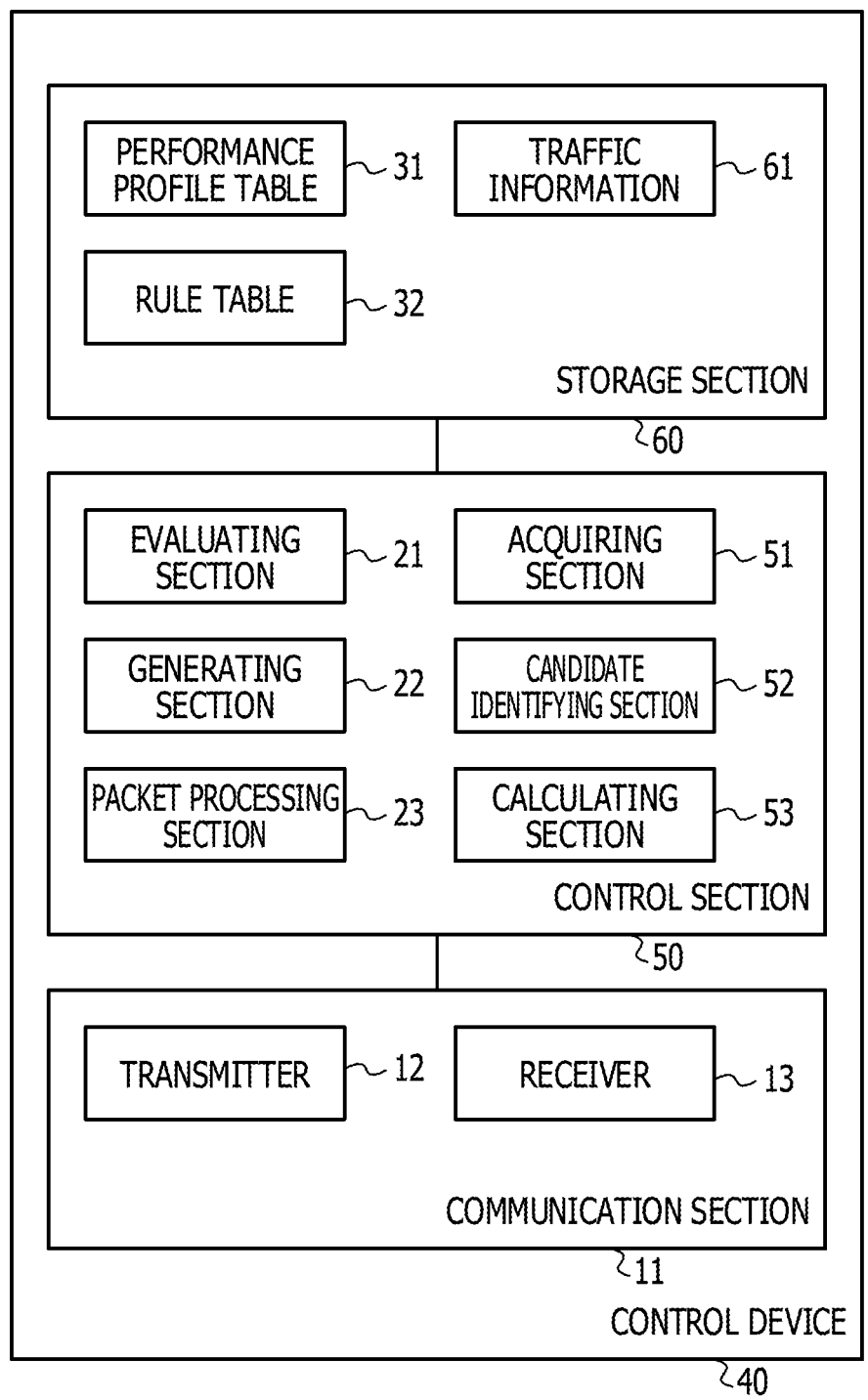
FIG. 13 is a diagram describing an example of a configuration of a control device according to a second embodiment.

FIG. 13 is a diagram describing an example of a configuration of the control device 40 according to the second embodiment. The control device 40 includes the communication section 11, a control section 50, and a storage section 60. The communication section 11 includes the transmitter 12 and the receiver 13. The control section 50 includes the evaluating section 21, the generating section 22, the packet processing section 23, an acquiring section 51, a candidate identifying section 52, and a calculating section 53. The storage section 60 stores the performance profile table 31, the rule table 32, and traffic information 61. The communication section 11, the evaluating section 21, the performance profile table 31, and the rule table 32 that are included in the control device 40 are the same as to those described in the first embodiment. A hardware configuration of the control device 40 is the same as that illustrated in FIG. 3. The communication section 11 is enabled by the network connection device 104. The control section 50 is enabled by the processor 101. The storage section 60 is enabled by the memory 102.

The acquiring section 51 acquires, for each of application requirements, the amount of a packet processed by the transfer device 5 during a predetermined time period from the transfer device 5, which is to be controlled by the control device 40, via the communication section 11. As a packet to be used by the acquiring section 51 in order to acquire the amount of a packet processed by the transfer device 5 during the predetermined time period for each of the application requirements, an arbitrary packet available upon the acquisition of traffic by the transfer device 5 to be controlled by the control device 40 may be applied. The acquiring section 51 stores the acquired information as the traffic information 61 in the storage section 60. The candidate identifying section 52 calculates the order of multiple processing rules included in the rule table 32 as available candidates for setting order in the case where the processing rules are set in different order from the order of the processing rules included in the current rule table 32. The calculating section 53 calculates an evaluation value serving as an index of a processing load applied in the transfer device 5 for each of the candidates calculated by the candidate identifying section 52 in the case where the rule table in which processing rules are set in order indicated by the candidate and traffic is indicated by the traffic information 61. The evaluation values serve as the indices for evaluating loads applied to the transfer device 5 that processes packets using processing time periods for rule types.

The generating section 22 updates the rule table 32 based on the evaluation values calculated by the calculating section 53. In the rule table 32, the rule table 6 held in one or more transfer devices 5 to be controlled by the control device 40 is associated with information identifying the one or more transfer devices 5 and is recorded. When the rule table 32 is updated, the packet processing section 23 generates a control packet to change the rule table held in the one or more transfer devices 5 so that information of the rule table 6 held in the one or more transfer devices 5 matches information of the rule table 32. The packet processing section 23 transmits, via the communication section 11, the generated control packet to the one or more transfer devices 5 to be controlled. Then, the one or more transfer devices 5 update the rule table 6 based on the control packet.

A method of generating an example of an evaluation value and an equation indicating the evaluation value are described below. A processing load (WL) applied to a transfer device 5 is expressed by Equation (1).

$$WL = \sum_{n=1}^{N} t_n \cdot P_n = t_1 \cdot P_1 + t_2 \cdot P_2 \ldots + t_N \cdot P_N \quad (1)$$

In Equation (1), $P_n$ indicates maximum throughput of the transfer device 5 for an n-th (n is in a range of 1 to N) rule registered in the rule table 6. The maximum throughput may be measured by the measurer 70 in a process that is the same as or similar to the process described with reference to FIG. 5. The following Equation (3) is obtained by substituting Equation (2) indicated in the model M11 described with reference to FIG. 9 into Equation (1).

$$P_n = a + \sum_{i=1}^{n} b_i \quad (2)$$

$$\sum_{n=1}^{N} t_n \cdot \left( a + \sum_{i=1}^{n} b_i \right) = \sum_{n=1}^{N} \left( t_n \cdot a + t_n \cdot \sum_{i=1}^{n} b_i \right) \quad (3)$$

The following Equation (4) is obtained by transforming Equation (3).

$$\sum_{n=1}^{N} t_n \cdot \left( a + \sum_{i=1}^{n} b_i \right) = \sum_{n=1}^{N} (t_n \cdot a) + \sum_{n=1}^{N} \left( t_n \cdot \sum_{i=1}^{n} b_i \right) \quad (4)$$

In each of Equations (2) to (4), a indicates a time period for transmitting and receiving a single packet by the transfer device 5. In each of Equations (2) to (4), $b_i$ indicates a performance profile determined based on a combination (rule types) of parameters specified as application requirements in an i-th processing rule registered in the rule table 6 from the top of the rule table 6. For example, it is assumed that rule types of processing rules included in the rule table 6 are four rule types, a rule for only destination IP addresses, a rule for only source IP addresses, a rule for only destination port numbers, and a rule for only source port numbers. In this case, since $b_i$ is determined based on the rule type of the i-th registered processing rule, $b_i$ is any of $b_{dip}$, $b_{sip}$, $b_{dp}$, and $b_{sp}$.

The first term on the right side of Equation (4) is a fixed value regardless of the order of the rules. It may be said that, as a value of the second term on the right side of Equation (4) is smaller, a processing load applied to the transfer device 5 is lower. The calculating section 53 uses, as an evaluation value, a value obtained from summation indicated by (5).

$$\sum_{n=1}^{N} \left( t_n \cdot \sum_{i=1}^{n} b_i \right) \quad (5)$$

In the summation indicated by (5), $b_i$ indicates a performance profile determined based on the rule type of the i-th registered processing rule. It is assumed that $b_i$ is set as the performance profile table 31 in the control device 40 by a process that is the same as or similar to the process described in the first embodiment.

FIG. 14 is a diagram describing an example of the rule table 32 and the traffic information 61. An example of processes to be executed in the second embodiment is described below with reference to FIG. 14. A rule table 32-1 is information that is included in the rule table 32 held in the control device 40 and is set in and extracted from the transfer device 5a. In the rule table 32-1, processing rules with numbers 1 to 4 and information indicating that the processing rules are set in the transfer device 5a are recorded.

The traffic information 61 is an example of information acquired by the acquiring section 51 after the acquiring section 51 transmits, to the transfer device 5a via the communication section 11, a control packet that requests the information of traffic processed by the transfer device 5a. Rule IDs indicate setting order of the processing rules set in the rule table 6 held in the transfer device 5a. Rule types are types of parameters used to specify application requirements of the processing rules. In the example illustrated in FIG. 14, since the rule table 6 held in the transfer device 5a is included in the rule table 32-1, the first processing rule set in the rule table 32-1 has a rule ID=1. Thus, a rule type of the processing rule having the rule ID=1 is a destination IP address. Rule types of processing rules having rule IDs=2 and 4 are a source IP address. A rule type of a processing rule having a rule ID=3 is a destination port number. Traffic processed by applying the applied processing rules having the rule IDs=1 to 4 is indicated in a field for traffic in the traffic information 61.

The candidate identifying section 52 generates candidates for the setting order of the processing rules included in the rule table 32-1. For example, the candidate identifying section 52 generates, as a candidate (candidate A) to be set in the rule table, the order of the rule IDs=1, 2, 4, and 3. In addition, the candidate identifying section 52 may generate, as another candidate (candidate B) settable in the rule table, the order of the rule IDs=3, 2, 4, and 1.

The calculating section 53 uses the performance profile table 31 (refer to FIG. 7) to calculate a value (evaluation value) from the summation indicated by (5) for each of the candidates generated by the candidate identifying section 52. For example, when traffic of a packet to which a processing rule having a rule ID=n is applied is tn, an evaluation value Y obtained for order indicated by the rule table 32-1 is t1×$b_{dip}$+t2×($b_{dip}$+$b_{sip}$)+t3×($b_{dip}$+$b_{sip}$+$b_{dp}$)+t4× ($b_{dip}$+$b_{sip}$+$b_{dp}$ $b_{sip}$). Thus, Y=684×3.69×10$^{-9}$+632×(3.69× 10$^{-9}$+3.49×10$^{-9}$)+246×(3.69×10$^{-9}$+3.49×10$^{-9}$+1.44× 10$^{-8}$)+230×(3.69×10$^{-9}$+3.49×10$^{-9}$+1.44×10$^{-8}$+ 3.49×10$^{-9}$)=1.81×10$^{-5}$.

An evaluation value Y1 obtained for the candidate A=t1× $b_{dip}$+t2×($b_{dip}$+$b_{sip}$)+t4×($b_{dip}$+$b_{sip}$+$b_{sip}$)+t3×($b_{dip}$+$b_{sip}$+$b_{sip}$+ $b_{dp}$)=1.57×10$^{-5}$. An evaluation value Y2 obtained for the candidate B=t3×$b_{dp}$+t2×($b_{dp}$+$b_{sip}$)+t4×($b_{dp}$+$b_{sip}$+$b_{sip}$)+t1× ($b_{dp}$+$b_{sip}$+$b_{sip}$+$b_{dip}$)=3.69×10$^{-5}$. The calculating section 53 calculates evaluation values for the other candidates generated by the candidate identifying section 52 and excluding the candidates A and B in the same manner as described above.

The generating section 22 generates a new rule table 32 by sorting the processing rules included in the rule table 32-1 in accordance with a candidate with the smallest evaluation value among the evaluation values obtained by the process executed by the calculating section 53. The example illustrated in FIG. 14 assumes that an evaluation value obtained for a candidate indicating the order of the rule IDs=2, 4, 1, and 3 is the smallest. Then, the generating section 22 updates the rule table 32-1 to a rule table 32-2 by using the candidate for which the smallest evaluation value is obtained.

As a processing rule of a rule type with a small performance profile value is set to be closer to the top of the rule table, an evaluation value obtained for the processing rule is smaller. In the case where multiple processing rules of the same rule type exist, as a processing rule applied to a packet with large traffic is set to be closer to the top of the rule table, an evaluation value obtained for the processing rule is smaller. Thus, according to the second embodiment, the generating section 22 sets multiple processing rules from the top of the rule table in ascending order of performance profile value. When multiple processing rules with the same performance profile value exist, the generating section 22 sets the processing rules in descending order of traffic.

FIG. 15 is a flowchart describing an example of a method of setting the rule table according to the second embodiment. In the flowchart illustrated in FIG. 15, a fixed value X, a variable Y, a variable x, and a variable m are used. The fixed value X is the total number of candidates generated by causing the candidate identifying section 52 to sort processing rules included in the rule table to be processed. The variable Y is a tentative minimum value among evaluation values. The variable x is used to count the number of candidates used for the calculation of the evaluation values and subjected to a comparison process. The variable m is used to identify a candidate for which the tentative minimum value is obtained.

The generating section 22 sets the variable Y to an infinite value (∞), the variable x to 1, and the variable m to 0 (in step S21). The calculating section 53 calculates an evaluation value yx for an x-th candidate (in step S22). The generating section 22 determines whether the variable Y is larger than the evaluation value yx (in step S23). When the variable Y is larger than the evaluation value yx (Yes in step S23), the generating section 22 substitutes the evaluation value yx into the variable Y, substitutes the variable x into the variable m, and stores the variables Y and m (in step S24). After that, the generating section 22 determines whether the variable x is smaller than the fixed value X (in step S25). When the variable x is smaller than the fixed value X (Yes in step S25), the generating section 22 increments the variable x by 1 and causes a process illustrated in FIG. 15 to return to step S22 (in step S26).

When the variable x is equal to or larger than the fixed value X (No in step S25), evaluation values obtained for all the candidates are already compared with the variable Y, the minimum evaluation value is held as the variable Y, and the order of the processing rules that is indicated by a candidate for which the minimum evaluation value is obtained is held as the variable m. Thus, the generating section 22 uses the m-th candidate to update the rule table 32 (in step S27).

When the variable Y is equal to or smaller than the evaluation value yx (No in step S23), the processes of steps S25 and later are executed to compare the variable Y with an evaluation value for a next candidate.

After the rule table 32 is updated by the process illustrated in FIG. 15, the control device 40 requests the transfer device 5 to update the rule table 6 held in the transfer device 5 based on the rule table 32 after the update. A process executed in this case is the same as or similar to the process executed by the control device 10 to cause the transfer device 5 to update the rule table 6 in response to the update of the rule table 32 in the first embodiment.

Figure 16:
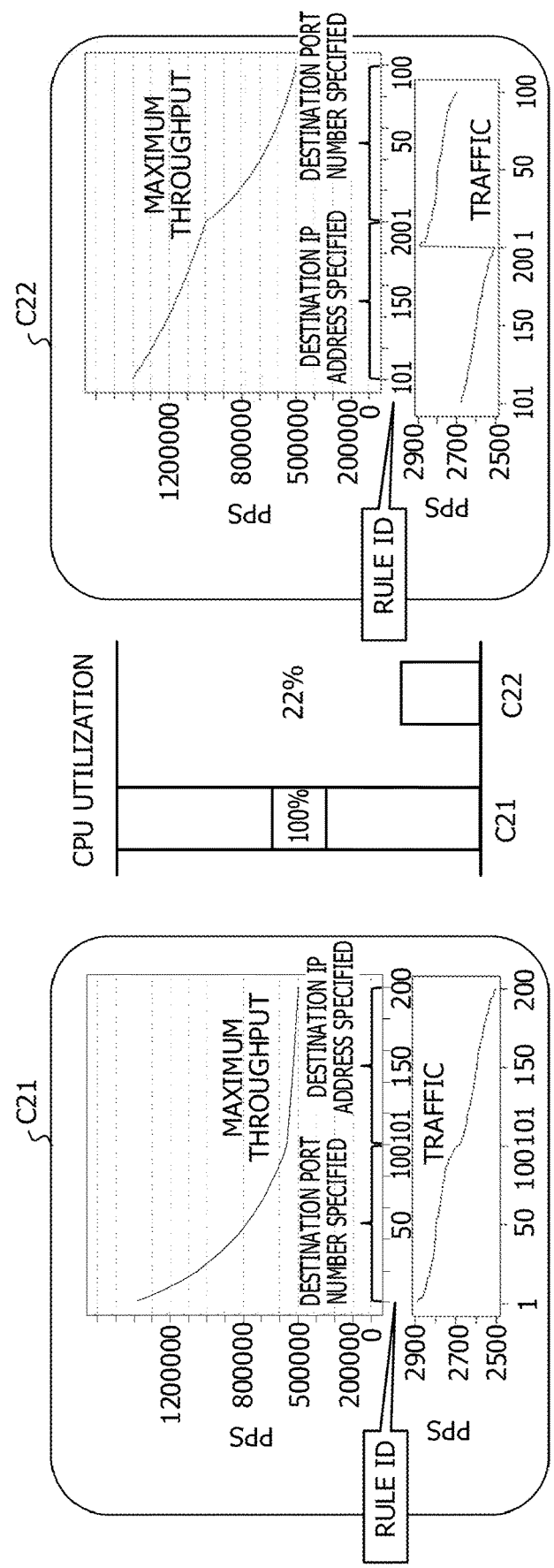
FIG. 16 is a diagram describing details set in the rule table and results of simulating a processing load.

FIG. 16 is a diagram describing details set in the rule table and results of simulating a processing load. Cases C21 and C22 assume that processing rules having rule IDs=1 to 200 are included in the rule table and that application requirements are set using destination port numbers in the processing rules having the rule IDs=1 to 100. In addition, cases C21 and C22 assume that application requirements are set using destination IP addresses in the processing rules having the rule IDs=101 to 200. In both cases C21 and C22, as a rule ID of a processing rule is smaller, traffic of a packet to which the processing rule is applied is larger.

Case C21 indicates a system using a rule table in which processing rules are sorted in descending order of traffic. Traffic and maximum throughput obtained for packets to which processing rules having rule IDs are applied in case C21 are illustrated on the left side of FIG. 16.

Case C22 indicates a system using a rule table generated by the generating section 22 in the second embodiment. Traffic and maximum throughput in case C22 are illustrated on the right side of FIG. 16. In case C22, multiple processing rules are set in ascending order of performance profile value from the top of the rule table. In case C22, when multiple processing rules with the same performance profile value exist, the processing rules are set in descending order of traffic. Even when any of the processing rules having the rule IDs is applied, the maximum throughput obtained for a packet to which the processing rule is applied in case C22 is larger than that in case C21.

A central portion of FIG. 16 illustrates CPU utilization of the transfer device 5 in the case where the system indicated in case C21 is used and CPU utilization of the transfer device 5 in the case where the system indicated in case C22 is used. When the system indicated in case C21 is used, the CPU utilization of the transfer device 5 reaches 100% and a packet loss of 11% occurs. When the system indicated in case C22 is used, the CPU utilization of the transfer device 5 is 22%.

Thus, as described in the second embodiment, the rule table 6 that causes only a low load in the transfer device 5 may be generated based on not only traffic for each of the processing rules but also processing loads applied when the determination of whether the processing rules are applicable is made. Thus, in the second embodiment, a processing load caused by a search for a processing rule to be applied in the transfer device 5 may be low.

Third Embodiment

A conflict relationship between multiple processing rules may exist depending on a rule table. A third embodiment describes details set in a rule table when a conflict relationship between multiple processing rules exists. In the following description, a relationship between rules that are sorted in different order from initial order and cause a different process to be executed from a process to be executed in accordance with the rules set in the initial order is referred to as conflict relationship.

FIG. 17 is a diagram describing an example in which conflict determination is made. For example, it is assumed that the control device 40 holds a rule table 32-3. In this case, information indicating that a packet specifying a destination port number=60 is to be discarded is set in a processing rule having a rule ID=1. A processing rule having a rule ID=2 indicates that a packet specifying a destination IP address=192.168.10.0/24 is to be discarded. Information indicating that a packet specifying a destination port number=80 is to be transferred is set in a processing rule having a rule ID=3.

In this case, since an application requirement (destination port number=80) of the processing rule having the rule ID=3 is not applied to a packet to which the processing rule having the rule ID=1 is applied, the processing rule having the rule ID=1 and the processing rule having the rule ID=3 do not have a conflict relationship. A packet (destination port number=60) to which the processing rule having the rule ID=1 is applied may satisfy an application requirement (destination IP address 192.168.10.0/24) of the processing rule having the rule ID=2. However, each of the processing rules having the rule IDs=1 and 2 indicates that a packet is to be discarded. Thus, regardless of whether the processing rule having the rule ID=1 or the processing rule having the rule ID=2 is set first, details of a process to be executed on a packet do not vary. Thus, the processing rule having the rule ID=1 and the processing rule having the rule ID=2 do not have a conflict relationship.

A packet (destination IP address 192.168.10.0/24) to which the processing rule having the rule ID=2 is applied may satisfy the application requirement (destination port number=80) of the processing rule having the rule ID=3. In this case, since processing details may vary depending on the order of the processing rules, the processing rule having the rule ID=2 and the processing rule having the rule ID=3 have a conflict relationship. For example, when the processing rule having the rule ID=2 is set before the processing rule having the rule ID=3 as indicated in the rule table 32-3, a packet specifying the destination IP address=192.168.10.0/24 and the destination port number=80 is discarded in accordance with the processing rule having the rule ID=2. When the processing rule having the rule ID=3 is set before the processing rule having the rule ID=2, the packet specifying the destination IP address=192.168.10.0/24 and the destination port number=80 is transferred in accordance with the processing rule having the rule ID=3.

In the third embodiment, the candidate identifying section 52 identifies processing rules having a conflict relationship and included in the rule table 32. A method of determining whether processing rules have a conflict relationship is a known arbitrary method.

After the candidate identifying section 52 generates candidates for the order of the sorted processing rules included in the rule table 32, the candidate identifying section 52 determines whether the order of multiple processing rules having a conflict relationship among the candidates for the order of the processing rules matches the order of the multiple processing rules before the sorting in the rule table 32. A table T21 illustrated in FIG. 17 indicates results (conflict determination results) of comparing candidates for sorted processing rules included in the rule table 32-3 with the order of processing rules having a conflict relationship. In the first candidate indicated in the table T21, the processing rule having the rule ID=1, the processing rule having the rule ID=3, and the processing rule having the rule ID=2 are sorted in this order. On the other hand, in the rule table 32-3, the processing rule having the rule ID=2 is set before the processing rule having the rule ID=3. Thus, a conflict determination result of the first candidate indicates that the order of the processing rules having the conflict relationship does not match the rule table 32-3 before the sorting (or the conflict determination result indicates NG).

In the second candidate indicated in the table T21, the processing rule having the rule ID=2, the processing rule having the rule ID=1, and the processing rule having the rule ID=3 are sorted in this order. Thus, in the second candidate and the rule table 32-3, the processing rule having the rule ID=2 is set before the processing rule having the rule ID=3. Thus, a conflict determination result of the second candidate indicates that the order of the processing rules having the conflict relationship matches the rule table 32-3 before the sorting (or the conflict determination result indicates OK). The same determination process is executed on the other candidates.

The candidate identifying section 52 selects, as an available candidate, only a candidate of which a conflict determination result is determined to indicate OK from among the generated candidates. For example, when the table T21 is used, the second and third candidates are selected as available candidates, but the first, fourth, and fifth candidates are determined to not be available. In this manner, in the generation of candidates for the order of processing rules, the candidate identifying section 52 limits candidates for the order of the processing rules so that the order of multiple processing rules having a conflict relationship matches the order of the processing rules included in the rule table 32 before the sorting.

The calculating section 53 calculates an evaluation value for only the candidate selected as the available candidate by the candidate identifying section 52. A process to be executed after the calculation of the evaluation value in the third embodiment is the same as or similar to that in the second embodiment.

Figure 18:
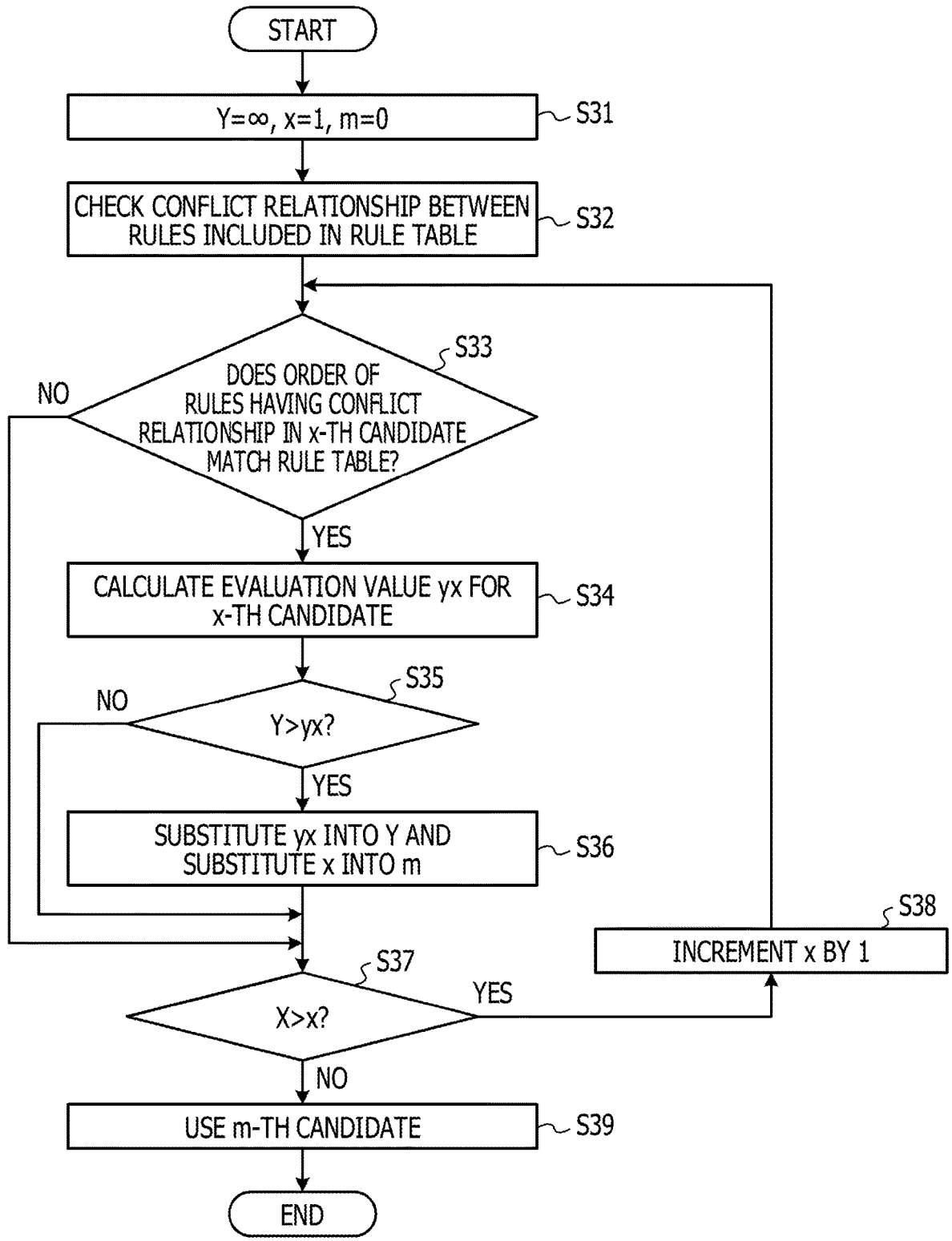
FIG. 18 is a flowchart describing an example of a method of setting processing rules according to a third embodiment.

FIG. 18 is a flowchart describing an example of a method of setting processing rules according to the third embodiment. In the flowchart illustrated in FIG. 18, a fixed value X, a variable Y, a variable x, and a variable m are used. The fixed value X is the total number of candidates generated by causing the candidate identifying section 52 to sort processing rules included in the rule table to be processed. The variable Y is a tentative minimum value among evaluation values. The variable x is used to count the number of candidates used for the calculation of the evaluation values and subjected to a comparison process. The variable m is used to identify a candidate for which the tentative minimum value is obtained.

The generating section 22 sets the variable Y to an infinite value ($\infty$), the variable x to 1, and the variable m to 0 (in step S31). The candidate identifying section 52 checks a conflict relationship between processing rules included in the rule table 32 (in step S32). The candidate identifying section 52 determines whether the order of processing rules having a conflict relationship in an x-th candidate matches the current rule table 32 (in step S33). It is assumed that the order of the processing rules having the conflict relationship in the x-th candidate matches the current rule table 32 (Yes in step S33). In this case, the calculating section 53 calculates an evaluation value yx for the x-th candidate (in step S34). The generating section 22 determines whether the variable Y is larger than the evaluation value yx (in step S35). When the variable Y is larger than the evaluation value yx (Yes in step S35), the generating section 22 substitutes the evaluation value yx into the variable Y, substitutes the variable x into the variable m, and stores the variables Y and m (in step S36). After that, the generating section 22 determines whether the variable x is smaller than the fixed value X (in step S37). When the variable x is smaller than the fixed value X (Yes in step S37), the generating section 22 increments the variable x by 1 and causes a process illustrated in FIG. 18 to return to step S33 (in step S38).

When the variable x is equal to or larger than the fixed value X (No in step S37), evaluation values obtained for all the candidates are already compared with the variable Y, the minimum evaluation value is held as the variable Y, and the order of processing rules that is indicated by a candidate for which the minimum evaluation value is obtained is held as the variable m. Thus, the generating section 22 uses the m-th candidate to update the rule table 32 (in step S39).

When the variable Y is equal to or smaller than the evaluation value yx (No in step S35), the processes of steps S37 and later are executed to compare the variable Y with an evaluation value for a next candidate. When the order of the processing rules having the conflict relationship in the x-th candidate is determined to not match the current rule table 32 (No in step S33), processes of steps S37 and later are executed to compare the evaluation value for the next candidate with the variable Y.

According to the third embodiment, even the rule table including the processing rules having the conflict relationship may be updated without a change in processing details so as to reduce a processing load to be applied to the transfer device 5.

Modified Examples

The embodiments are not limited to the above description and may be variously modified. Some modified examples are described below.

The cases where each of the control devices 10 and 40 sets the rule table 32 and causes the transfer device 5, which is to be controlled, to set, as the rule table 6, information that is included in the rule table 32 after the setting and is to be used by the transfer device 5 are described above as examples. The transfer device that has acquired processing rules to be set in the rule table 6 may update the rule table 6 of the transfer device using the same method as the methods to be used by the control devices 10 and 40.

Figure 19:
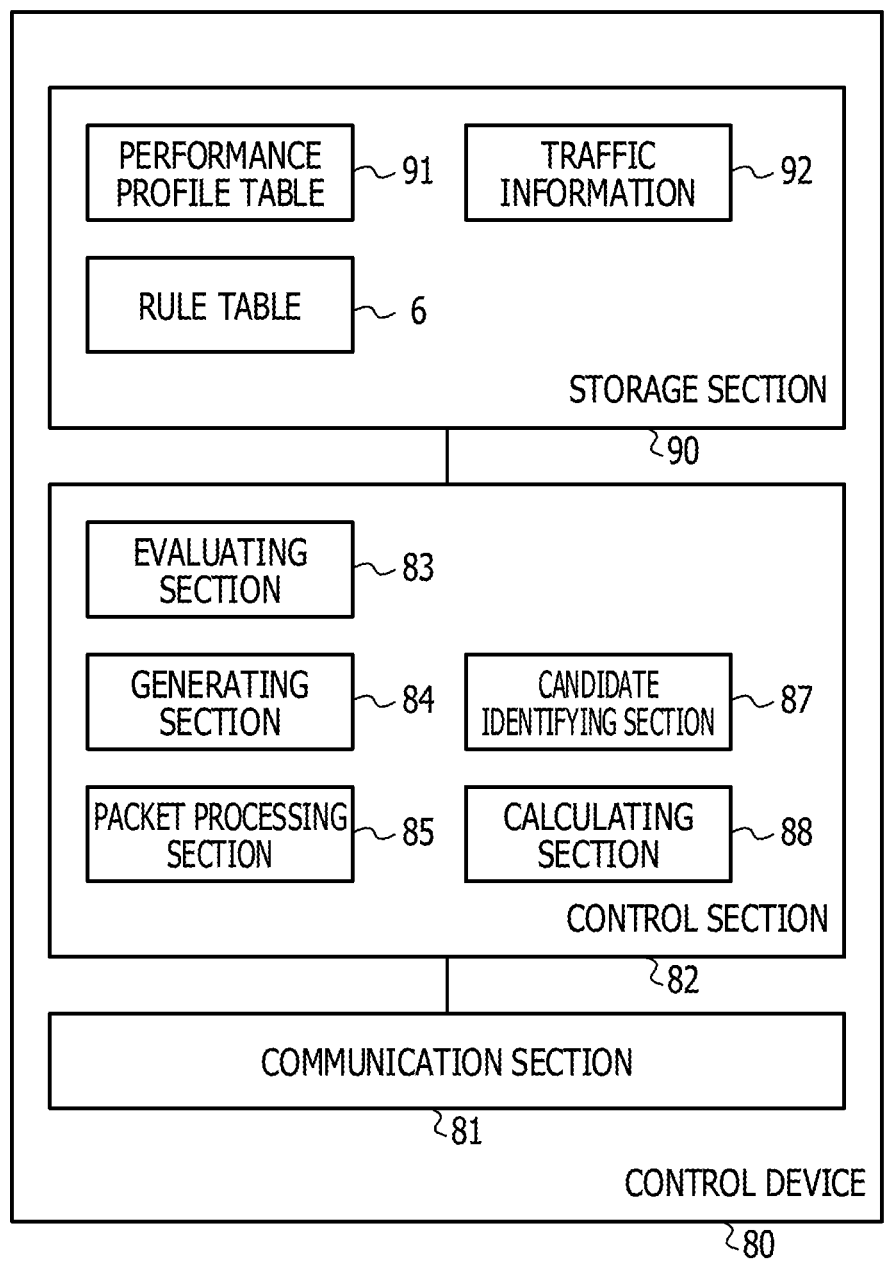
FIG. 19 is a diagram illustrating an example of a configuration of a transfer device.

FIG. 19 is a diagram illustrating an example of a configuration of a transfer device 80. The transfer device 80 includes a communication section 81, a control section 82, and a storage section 90. The control section 82 includes an evaluating section 83, a generating section 84, and a packet processing section 85 and includes, as options, a candidate identifying section 87 and a calculating section 88. A hardware configuration of the transfer device 80 is the same as that illustrated in FIG. 3. The communication section 81 is enabled by the network connection device 104. The control section 82 is enabled by the processor 101. The storage section 90 is enabled by the memory 102.

The storage section 90 stores a performance profile table 91, traffic information 92, and the rule table 6. The performance profile table 91 is information calculated by the same process as that used for the performance profile table 31 in the first embodiment. The traffic information 92 is related to traffic for each of processing rules for packets to be processed by the transfer device 80 and is the same as or similar to the traffic information 61 held in the control device 40.

The communication section 81 transmits and receives a packet to and from other devices including the control devices. The packet processing section 85 processes a packet. The packet processing section 85 records, in the rule table 6, a processing rule indicated in a control packet received from a control device. The packet processing section 85 records, as the performance profile table 91, information acquired from the measurer 70. In addition, the packet processing section 85 processes, in accordance with the rule table 6, a packet received from a device that is neither a control device nor the measurer 70 and is included in a network.

When traffic is not used to update the rule table 6, the transfer device 80 may not include the candidate identifying section 87 and the calculating section 88, like the first embodiment. The evaluating section 83 uses the performance profile table 91 to evaluate a processing load for each of the processing rules included in the rule table 6. The generating section 84 changes the order of the processing rules included in the rule table 6 based on the results of the evaluation by the evaluating section 83. A process executed in this case is the same as or similar to the process described with reference to FIG. 10 and the like.

In the case where the rule table 6 is updated based on traffic, the transfer device 80 includes the candidate identifying section 87 and the calculating section 88. The candidate identifying section 87 generates candidates that indicate the order of the processing rules sorted in the rule table 6. The calculating section 88 uses the performance profile table 91 and the traffic information 92 to calculate evaluation values for the generated candidates. The evaluation values and a process of calculating the evaluation values are the same as or similar to those described in the second embodiment. In this case, the generating section 84 changes the order of the processing rules included in the rule table 6 based on the results of the calculation by the calculating section 88 so as to reduce a processing load of the transfer device 80. Processes executed in this case are the same as or similar to the processes described with reference to FIGS. 15 and 18 and the like.

The tables and the like that are described above are examples. The information elements included in the tables may be changed based on implementation.

The case where the one or more transfer devices 5 operate as the SDN switches are described above as an example. The one or more transfer devices 5, however, may operate as devices that are not SDN switches and process the tables in an arbitrary manner.

The cases where the candidate identifying sections 52 and 87 calculate all the candidates indicating the order of sorted processing rules are described above. The methods to be executed by the candidate identifying sections 52 and 87 to calculate the candidates may be changed based on the implementation. For example, the candidate identifying sections 52 and 87 may use the calculated candidates and evaluation values obtained for the candidates to search for a candidate in accordance with a genetic algorithm. In this case, each of the candidate identifying sections 52 and 87 generates a candidate indicating the order of changed processing rules based on a candidate for which an excellent evaluation value is obtained.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control device that controls a transfer device, comprising:
   a memory; and
   a processor coupled to the memory and configured to evaluate, for each of a plurality of processing rules to be used to process a packet in the transfer device, a processing load caused upon identification of a packet matching the processing rule, based on the type of an application requirement identifying the packet to which the processing rule is applied, generate, as a table to be used by the transfer device, a rule table storing the plurality of processing rules in order from the lowest processing load to the highest processing load, transmit, to the transfer device, a control packet to request the transfer device to set the rule table, acquire traffic information that indicates an amount of a packet processed by the transfer device during a predetermined time period and has been calculated for each of the plurality of processing rules, calculate available candidates for the order of the processing rules in a case in which the order of the processing rules is set to different order from the order of the processing rules included in the rule table, calculate, for the candidates, index values of processing loads caused when amounts of packets to which the plurality of processing rules are applied during the predetermined time period are the same as the traffic information, and update the order of the plurality of processing rules included in the rule table set in the transfer device to order specified by a candidate for which the smallest index value is obtained.

2. The transfer device according to claim 1, wherein the processor determines whether a combination of processing rules that causes a change in a process to be executed on a packet in the transfer device upon a change in the order of the plurality of processing rules is included in the plurality of processing rules, and when the combination is included in the plurality of processing rules, the processor selects candidates in which the order of the processing rules included in the combination is the same as the rule table, from among available candidates for the order of the plurality of processing rules in a case in which the order of the plurality of processing rules is set to different order from the rule table, and the processor calculates index values for the selected candidates.

3. The transfer device according to claim 1, wherein each of the index values is a function of a product of a time period for determining that each of the processing rules is applied to a packet to be processed and the amount of a packet that is to be processed by the transfer device during a predetermined time period and to which the processing rule is applicable.

4. A transfer device that processes a packet using a processing rule notified by a control device, comprising:
an interface configured to transmit and receive a packet;
a memory configured to store traffic information that indicates an amount of a packet processed by the transfer device during a predetermined time period and has been calculated for each of a plurality of processing rules; and
a processor configured to:
evaluate, for each of the plurality of processing rules notified by the control device, a processing load caused upon identification of a packet matching the processing rule, based on the type of an application requirement identifying the packet to which the processing rule is applied, generate a rule table storing the plurality of processing rules in order from the lowest processing load to the highest processing load, and process a packet received by the processor in accordance with the rule table;

calculate, for the candidates, index values of processing loads caused when amounts of packets to which the plurality of processing rules are applied during the predetermined time period are the same as the traffic information, and update the order of the plurality of processing rules included in the rule table set in the transfer device to order for which the smallest index value is calculated.

5. The transfer device according to claim 4, wherein the processor determines whether a combination of processing rules that causes a change in a process to be executed on a packet in the transfer device upon a change in the order of the plurality of processing rules is included in the plurality of processing rules, and when the combination is included in the plurality of processing rules, the processor selects candidates in which the order of the processing rules included in the combination is the same as the rule table, from among available candidates for the order of the plurality of processing rules in a case in which the order of the plurality of processing rules is set to different order from the rule table, and the processor calculates index values for the selected candidates.

6. The transfer device according to claim 4, wherein each of the index values is a function of a product of a time period for determining that each of the processing rules is applied to a packet to be processed and the amount of a packet that is to be processed by the transfer device during a predetermined time period and to which the processing rule is applicable.

7. A method of controlling a transfer device, comprising:
evaluating, for each of a plurality of processing rules to be used to process a packet in the transfer device, a processing load caused upon identification of a packet matching the processing rule, based on the type of an application requirement identifying the packet to which the processing rule is applied;

generating, as a table to be used by the transfer device, a rule table storing the plurality of processing rules in order from the lowest processing load to the highest processing load;

transmitting, to the transfer device, a control packet to request the transfer device to set the rule table;

acquiring, from the transfer device, traffic information that indicates an amount of a packet processed by the transfer device during a predetermined time period and has been calculated for each of the plurality of processing rules;

calculating available candidates for the order of the processing rules in a case in which the order of the processing rules is set to different order from the order of the processing rules included in the rule table;

calculating, for the candidates, index values of processing loads caused when amounts of packets to which the plurality of processing rules are applied during the predetermined time period are the same as the traffic information; and updating the order of the plurality of processing rules included in the rule table set in the transfer device to order for which the smallest index value is calculated.

8. The control method according to claim 7, further comprising:
- determining whether a combination of processing rules that causes a change in a process to be executed on a packet in the transfer device upon a change in the order of the plurality of processing rules is included in the plurality of processing rules;
- selecting, when the combination is included in the plurality of processing rules, candidates in which the order of the processing rules included in the combination is the same as the rule table, from among available candidates for the order of the plurality of processing rules in a case in which the order of the plurality of processing rules is set to different order from the rule table; and
- calculating index values for the selected candidates.

9. The control method according to claim 7, wherein
- each of the index values is a function of a product of a time period for determining that each of the processing rules is applied to a packet to be processed and the amount of a packet that is to be processed by the transfer device during a predetermined time period and to which the processing rule is applicable.

\* \* \* \* \*